US007739584B2

(12) United States Patent
Vella et al.

(10) Patent No.: US 7,739,584 B2
(45) Date of Patent: Jun. 15, 2010

(54) ELECTRONIC MESSAGING SYNCHRONIZED TO MEDIA PRESENTATION

(76) Inventors: Zane Vella, 1112 Tennessee, San Francisco, CA (US) 94107; Brian Benitez, 604 Vermont #1, San Francisco, CA (US) 94107; Ole Lutjens, 1286 Guerrero St. #7, San Francisco, CA (US) 94110; Jeffrey Braun, 105 Alta Haciendas Rd., Orinda, CA (US) 94563

( * ) Notice: Subject to any disclaimer, the term of this patent is extended or adjusted under 35 U.S.C. 154(b) by 176 days.

(21) Appl. No.: 10/622,370

(22) Filed: Jul. 18, 2003

(65) Prior Publication Data

US 2004/0098754 A1      May 20, 2004

Related U.S. Application Data

(60) Provisional application No. 60/402,358, filed on Aug. 8, 2002.

(51) Int. Cl.
*G06F 17/21* (2006.01)
(52) U.S. Cl. .................. 715/203; 715/200; 715/201; 715/202; 715/204
(58) Field of Classification Search ................. 715/500, 715/500.1, 501.1, 512, 530, 200, 201, 202, 715/203, 204; 725/44
See application file for complete search history.

(56) References Cited

U.S. PATENT DOCUMENTS

| | | | |
|---|---|---|---|
| 4,975,771 A | 12/1990 | Kassatly | |
| 5,404,295 A | 4/1995 | Katz et al. | |
| 5,734,862 A | 3/1998 | Kulas | |
| 5,850,545 A | 12/1998 | Matsushita | |
| 5,895,124 A | 4/1999 | Tsuga et al. | |
| 5,913,010 A | 6/1999 | Kaneshige et al. | |
| 5,923,627 A | 7/1999 | Miwa et al. | |
| 5,929,857 A | 7/1999 | Dinalto et al. | |
| 5,963,256 A | 10/1999 | Tahara | |
| 5,999,698 A | 12/1999 | Nakai et al. | |

(Continued)

FOREIGN PATENT DOCUMENTS

JP          07210174          8/1995

OTHER PUBLICATIONS

Bargeron et al. "Annotations for Streaming Video on the Web", CHI '99 Extended Abstracts on Human Factors in Computing Systems, ACM Press, published 1999, pp. 278-279.*

*Primary Examiner*—Joshua D Campbell
(74) *Attorney, Agent, or Firm*—Knobbe, Martens, Olson & Bear LLP

(57) ABSTRACT

Techniques for electronic messaging synchronized to media presentation are provided. The techniques include a method for displaying text in connection with an audiovisual production, a method for displaying text in connection with playback of an audiovisual production, a method for synchronizing viewer-inputted messages with playback of an audiovisual production, and others. For example, a method for displaying a message in connection with an audiovisual production includes receiving a signal from a viewer interface to define the message, displaying the defined message adjacent to a first display of the audiovisual production, and displaying the defined message in a second display adjacent to the audiovisual production. In addition, the present invention provides a system for displaying messages in connection with playback of prerecorded media to produce an audiovisual production and a computer-readable medium with instructions for displaying messages in connection with an audiovisual production.

48 Claims, 15 Drawing Sheets

U.S. PATENT DOCUMENTS

| | | | |
|---|---|---|---|
| 6,006,241 A * | 12/1999 | Purnaveja et al. | 715/512 |
| 6,085,185 A | 7/2000 | Matsuzawa et al. | |
| 6,088,506 A | 7/2000 | Yoshio et al. | |
| 6,105,063 A | 8/2000 | Hayes, Jr. | |
| 6,173,287 B1 * | 1/2001 | Eberman et al. | 707/102 |
| 6,173,317 B1 * | 1/2001 | Chaddha et al. | 709/219 |
| 6,245,982 B1 | 6/2001 | Suzuki | |
| 6,246,401 B1 | 6/2001 | Setogawa et al. | |
| 6,256,453 B1 | 7/2001 | Takano | |
| 6,263,346 B1 | 7/2001 | Rodriquez | |
| 6,289,165 B1 | 9/2001 | Abecassis | |
| 6,307,550 B1 | 10/2001 | Chen et al. | |
| 6,332,144 B1 * | 12/2001 | deVries et al. | 707/102 |
| 6,362,837 B1 * | 3/2002 | Ginn | 715/751 |
| 6,404,925 B1 | 6/2002 | Foote et al. | |
| 6,430,361 B2 | 8/2002 | Lee | |
| 6,430,609 B1 | 8/2002 | Dewhurst et al. | |
| 6,434,097 B1 | 8/2002 | Lewis et al. | |
| 6,449,653 B2 | 9/2002 | Klemets et al. | |
| 6,467,080 B1 | 10/2002 | Devine et al. | |
| 6,477,315 B1 | 11/2002 | Ohomori | |
| 6,501,770 B2 | 12/2002 | Arsenault et al. | |
| 6,546,405 B2 * | 4/2003 | Gupta et al. | 715/512 |
| 6,687,211 B2 | 2/2004 | Sawabe et al. | |
| 6,731,185 B2 | 5/2004 | Taniguchi | |
| 6,789,109 B2 | 9/2004 | Samra et al. | |
| 6,806,885 B1 | 10/2004 | Piper et al. | |
| 6,898,799 B1 | 5/2005 | Jarman | |
| 6,954,419 B1 | 10/2005 | Kimura et al. | |
| 6,954,581 B2 | 10/2005 | Miller et al. | |
| 6,965,723 B1 | 11/2005 | Abe et al. | |
| 6,985,188 B1 | 1/2006 | Hurst, Jr. | |
| 7,151,214 B2 | 12/2006 | Barry | |
| 7,161,079 B2 | 1/2007 | Nishitani et al. | |
| 2001/0033736 A1 | 10/2001 | Yap et al. | |
| 2002/0032768 A1 | 3/2002 | Voskuil | |
| 2002/0092021 A1 | 7/2002 | Yap et al. | |
| 2003/0191776 A1 * | 10/2003 | Obrador | 707/104.1 |
| 2003/0236581 A1 | 12/2003 | Chambers et al. | |
| 2004/0068567 A1 | 4/2004 | Moran et al. | |
| 2004/0073930 A1 | 4/2004 | Demas et al. | |
| 2004/0078215 A1 | 4/2004 | Dahlin et al. | |
| 2004/0107439 A1 * | 6/2004 | Hassell et al. | 725/44 |
| 2004/0179025 A1 | 9/2004 | Samra et al. | |
| 2004/0181592 A1 | 9/2004 | Samra et al. | |
| 2004/0201544 A1 | 10/2004 | Love et al. | |
| 2005/0234958 A1 * | 10/2005 | Sipusic et al. | 707/102 |
| 2005/0262542 A1 | 11/2005 | DeWeese et al. | |

* cited by examiner

ELECTRONIC MESSAGING SYNCHRONIZED TO MEDIA PRESENTATION

CROSS-REFERENCES TO RELATED APPLICATIONS

This application claims priority to U.S. Provisional No. 60/402,358 filed Aug. 8, 2002, which is incorporated by reference herein.

BACKGROUND OF THE INVENTION

This invention relates in general to playback of an audiovisual production and more specifically to playback of an audiovisual production from a Digital Versatile Disk (DVD) while allowing the creation and display of synchronized text messages.

Playback of audiovisual productions using DVDs and DVD players is growing in popularity. Audiovisual productions include music videos, concerts, movies, games, public or private events and other similar types of recorded performances. As used herein, audiovisual productions also generally encompass audio productions, visual productions or other media presentations recorded on a compact disk (CD), digital versatile disk (DVD) or other such storage medium or transmitted over satellite or cable systems. Audiovisual productions can be viewed from computer systems, consumer digital devices, and other displays, systems or platforms. Consumer digital devices include video Compact Disk (CD) players or DVD players. Other platforms, such as MPEG players, allow storage or streaming of audiovisual productions over digital networks or the Internet. Unfortunately, playing or viewing previously recorded audiovisual productions are relatively static and do not change. Accordingly, there is diminished motivation for the viewer to return to the production over time. What is needed is a method to enhance the viewing experience and to provide the viewer greater insight into the production each time the production is viewed.

Exchanging text messaging over a digital network is also gaining popularity. Various communication techniques for text messages have been developed. For example, messaging systems based on "bulletin boards" usually provide a common set of functionality to enable open discussions that are available to all viewers in an organized and efficient manner. The organization and efficiency in communication are accomplished with the use of "threads," which are essentially subject hierarchies. Under each subject hierarchy, an initial message on any topic starts a "thread," and all messages in response to this initial message are organized with this "thread." All messages within the same thread are usually organized on a viewer interface with indentations, where the initial message of the thread appears in the leftmost position, and replies to this message are indented. Such indentations provide an easy-to-scan hierarchy of content. Further, text messaging systems based on "bulletin boards" may provide multiple levels of threading whereby responses to an initial message can initiate new, "deeper" threads of their own, thus creating a nested table of replies that can be at once freeform and highly organized.

However, what is needed is a method for viewers of audiovisual productions to discuss the production with other viewers in a manner that encourages communication and that enhances the exchange of opinions and information. Accordingly, there is a great need for coupling features of message threads with the viewing of previously recorded audiovisual productions. However, because many comments are scene specific, the threads need to be linked to specific frames or groups of frames of the audiovisual production. Further, what is needed is a messaging system that provides communications of messages over digital networks that are linked to the performance of an audiovisual production to improve a viewer's enjoyment and inform the viewer upon playback of an audiovisual production.

BRIEF SUMMARY OF THE INVENTION

The present invention relates to a method for enhancing the viewing of static or previously recorded audiovisual productions by linking a messaging system to the viewing process to allow viewers to post messages, and replies to those messages, on threaded "bulletin boards" relating to each audiovisual production with each message linked to the audio and/or video media timeline. During the viewing process, messages appear at certain moments, and exist in a messaging interface region for a specific duration—allowing messages to be linked to specific moments in the audio/video presentation. The messages are threaded so that viewers can reply to messages in an organized fashion—allowing a community of viewers to discuss the media content asynchronously, at leisure, but also with a sense of being "in the moment" as the discussion is tied to their own current experience of audiovisual production. The representation of messages is such that any viewer can easily find the information they want to discuss as the method provides simple components to respond to post and to filter out unwanted information.

The messaging system provides the tools to link a web-based threaded messaging system to media playback time code. In this manner, artists and related creative/editorial personnel, as well as regular viewers, can create messages presented with audiovisual production that are tied to moments in the media available on the discs. The message threads are stored on a server accessible via the Internet, so that any computer connected to the communication network will be able to pull messages into a messaging client interface. Thus, the present invention creates another avenue of channeling new, fresh content to an otherwise static interactive experience.

It will be appreciated that the amount of viewing space is limited and the viewing window is limited by the play rate. Thus, a key challenge is to simplify the messaging functionality so that it fits within the limited screen real estate given a limited user control interface, so that the presentation of the message threads do not significantly interfere with the viewer's viewing experience. Further, due to the limited space and time, filtering of less relevant threads, or portions of the threads, are provided so that viewers can restrict the displayed threads to only those postings and/or authors that they wish to see (again, within a limited control interface). When the viewer does not wish to see to see the messages, the audiovisual production may be displayed without messages. In this manner, the audiovisual production uses the entire screen real estate. When the viewer comes to an interesting portion of the audiovisual production, the viewer activates the messaging system and views messages. When finished viewing the messages, the viewer may switch back to the full screen audiovisual production.

In accordance with the present invention, a method for providing electronic messaging synchronized to an audiovisual production is provided. While streaming an audiovisual production to a display device, a viewer may simultaneously view message threads relating to the production. The method includes receiving a signal defining a message, which may include alphanumeric text, audio or pictures, from a viewer interface, displaying the defined message adjacent to a display of the audiovisual production.

In another embodiment of the present invention, a method for synchronizing messages input by the viewer with playback of an audiovisual production includes associating a given message thread with a determined point in time of the playback, and displaying the given message at the determined point in time during the playback.

In yet another embodiment of the present invention, a method for displaying text in connection with playback of an audiovisual production includes providing playback of an audiovisual production on a display platform, and displaying a message thread input by the viewer regardless of the display platform or point in time of the playback.

In yet another embodiment of the present invention, a system for displaying a message thread in connection with playback of prerecorded media to produce an audiovisual production that includes a receiving system for receiving a signal from a viewer interface to define a message containing alphanumeric text, images or sound during playback of the audiovisual production, and a determination system to associate the message to a point, series of points, or one or more defined portions in the playback. In addition, the system includes a storage system for storing the message thread along with an indication of the associated point in the playback. Moreover, the system includes a displaying system for displaying the message thread adjacent to playback of the audiovisual production, and substantially at the associated point in time of the playback.

In yet another embodiment of the present invention, a computer-readable medium includes instructions for displaying message threads in connection with an audiovisual production. More specifically, the computer-readable medium includes one or more instructions for receiving a signal from a viewer interface to define alphanumeric text and or additional message content such as audio or images, and one or more instructions for displaying the defined message adjacent to a first display of the audiovisual production. In addition, the computer-readable medium includes one or more instructions for displaying the defined alphanumeric text adjacent to a second display of the audiovisual production.

In yet another embodiment, the playback of a DVD at a master display system is synchronized with the playback of a DVD containing the same audiovisual production but which is resident in one or more slave DVD players. From the master computer, a viewer who initiates a group-viewing session is provided with DVD player commands to control playback at other computers or DVD players participating in the group-viewing session. This embodiment enables multiple viewers to exchange messages while viewing the same audiovisual production at the same time. To initiate a group viewing, a viewer at the master computer initiates a call to other viewers to join in and a list of viewers is created. From that point forward, the master computer controls the playback of the audiovisual production for all viewers.

To initiate a group viewing, a viewer at the master computer or other device initiates a call to other viewers to join in and a list of viewers is created. From that point forward, the master computer controls the playback of the audiovisual production for all viewers.

DETAILED DESCRIPTION OF THE INVENTION

In the following description of a preferred embodiment, reference is made to the accompanying drawings, which form a part hereof, in which is shown by way of illustration specific embodiment in which the invention may be practiced. In the following description, numerous specific details are set forth in order to provide a complete understanding of the present invention. It will be apparent to one skilled in the art that the present invention may be practiced without the specific details. In the development of the actual implementation, numerous implementation-specific decisions must be made to achieve the design goals that will vary for each implementation. Accordingly, in order not to obscure the present invention, well-known structures and techniques are not shown or discussed in detail.

According to the present invention, techniques for electronic messaging synchronized to media presentation are provided. In one embodiment, a display device for playback of an audiovisual production receives alphanumeric text or other message content entered or provided by viewers of the audiovisual production. One preferred flexible and fully featured web messaging system is available at http://scoop.kuro5hin.org/ (Scoop) which provides a robust engine for posting, classifying and gardening messages combined with a self-rating system. Another preferred messaging system is commonly referred to as "wiki" and implementation information may be found at http://www.wikipedia.com/ wiki/wikipedia on the FAQ page. Essentially, a wiki refers to a web page that can be edited by the public using a simplified syntax. Users become a self-organizing community that gives greater weight to frequent users who tend to garden the page to provide more useful and relevant information. Other methods for generating and storing messages are known such as, by way of example, a chat room system, electronic mail, message board system or an instant mail system. The display device may be a computer system, a consumer digital device, other display, system, or platform, or combination thereof. A consumer digital device may be a video Compact Disk (CD) player, a DVD player, or other.

Figure 1A:
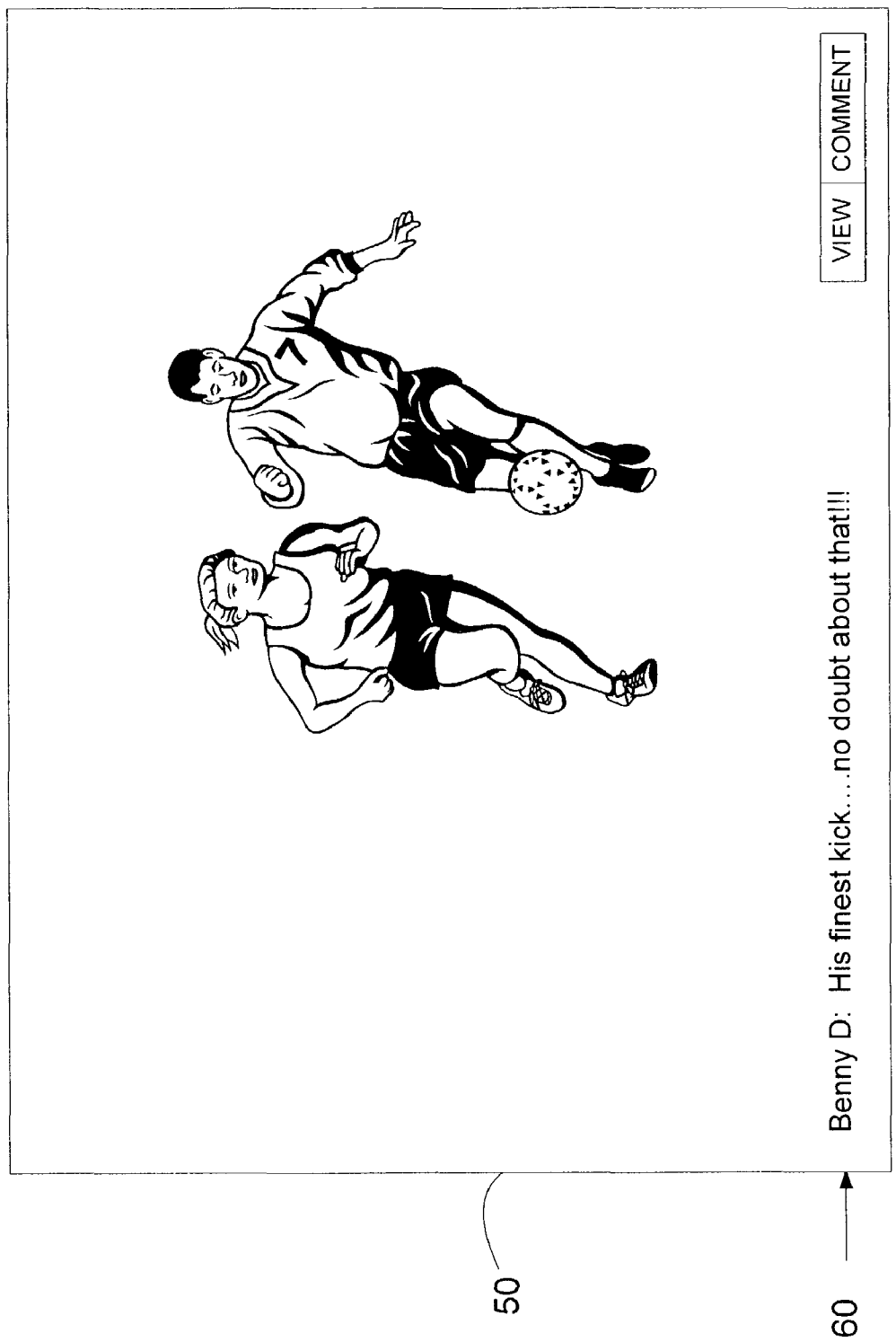
FIG. 1A illustrates presentation of an audiovisual production in conjunction with messages linked to time codes of the production.

With reference to FIG. 1A, the method of the present invention enables the viewer who desires minimal interactivity to passively experience the message stream or to 'turn-off' the message portion of the display. However, any viewer can become more active in the messaging community at any time. The present invention creates a community of interested viewers by allowing an open messaging board that any owner of an enhanced DVD (that is a DVD that includes the message thread link) can post to. Viewers may create their own comments, respond to others' comments, and annotate the DVD video experience as they see fit—creating a compelling reason to view the DVD again and again, as well as creating brand loyalty with both the subject of the DVD and the supplier of the DVD. Clearly, the present invention enables the performers, actors or the artists to create annotated "tours" of the content available on the DVD. The annotations guide the viewer through moments of video, giving an inside perspective on the event being shown. Viewers are able to navigate from one message event to the next, using "tour" navigation controls; or simply to watch the entire video and have the messages appear on-screen as the message events are triggered by the playback timeline. Alternatively, viewers may review messages and then jump to the location of the audiovisual production being discussed in the message.

The primary interface to the messaging application is initially unobtrusive; as such, the main interface (as well as the first interface a viewer will perceive when choosing to engage the messaging application) is a screen in which the video dominates the available real estate of the display as shown generally at 50. In this initial viewing mode, the headlines and any messaging control interface appears in a lower area of the screen in a manner that approximates an orientation which all viewers of modern television programs are familiar. More specifically, the headlines and viewing interface appear as a news-style view where the focus is always on the subject of the video and the textual and context information is displayed superimposed along a bottom portion of the screen as generally indicated at 60.

If the viewer does not wish to view the headlines, the messaging display may be deactivated until the viewer determines it desirable to view messages relating to the currently viewed portion of the audiovisual production. Accordingly, the viewer may switch between a full screen video display and full screen display of messages related to the current time code. In operation, when playback of the audiovisual production comes to an interesting portion, the viewer may select to switch to message display using the pause or a message button associated with the viewer interface. With the playback paused, the viewer has a full screen messaging window relating to the portion of the audiovisual production. The displayed messages are linked to a time code most closely proximate to the playback time code. When finished reading the messages, the viewer returns to the playback of the audiovisual production at the time code where paused. During the time the messages are displayed, the viewer may select to display non-contiguous portions of the audiovisual production identified in one or more of the messages and then return to normal playback after reading the messages of interest.

When a DVD, having one or a plurality of audiovisual productions recorded thereon, is inserted into a DVD player, the DVD player identifies the DVD and contacts a remote messaging server to request a top-level index containing a list of audiovisual productions that have messages on the messaging server. Typically, the messaging server is connected via the Internet or other digital communication network.

From the messaging server, the DVD player receives an index for message subjects associated to each audiovisual production on the DVD. Each subject index contains subject headings of messages directed to an audiovisual production, and the start and end time indications of each message subject. The start and end time indications may comprise start and end time codes associated with the audiovisual production or DVD index information, such as chapters. The DVD player may subsequently download the subject index for each audiovisual production, or alternatively the DVD player may utilize a predictive process and attempts to download only the subject index for the audiovisual production most likely to be viewed by the viewer. Alternatively, the DVD player may download the subjective index of an audiovisual production only upon selection by the viewer.

The downloaded subject index may be stored in the local disk cache of the DVD player or in a storage unit coupled to the DVD player. The cache memory may be temporary or preferably permanent. With permanent cache memory, once a subject index is downloaded it remains available for future uses. In future uses, the subject index previously downloaded onto the local disk cache may be compared to the current version of the subject index on the messaging server. The comparison determines whether any update to the subject index needs to be downloaded. Furthermore, when the DVD player downloads a subject index, it may also download body text of all messages related to the subject index. Alternatively, the DVD player may download body text of messages only when the start timecode of the messages has arrived, and consequently store the messages in the local disk cache awaiting viewer action.

Upon viewer selection, the DVD player or other display device plays back an audiovisual production, which may be a movie, a game, or other media presentation. The playback involves access to an audiovisual production stored on the display device, stored on a storage unit locally connected to the display device, or on a storage unit connected to the display device over a digital network. The digital network may be the Internet or other network. By way of example, a movie or a concert recorded on a DVD may be displayed by a DVD player or a computer system together with the messages obtained from the message server. The display screen may be a television screen, a computer screen, or a display area of other display device. The display screen provides, in addition to windows for alphanumeric text and the audiovisual production, a viewer interface to receive the viewer's inputs, so that the viewer may resize the windows for alphanumeric text and audiovisual production. During play back of the audiovisual production, the message is displayed as superimposed over a portion of the display of the audiovisual production. Alternatively, the message or alphanumeric text may be displayed in the lower third part of a display screen without overlapping the display of the audiovisual production.

As the audiovisual production plays back, text "headlines" (akin to the initial message subject headlines in standard threaded messaging systems) or visual icons (not shown) will appear—these headlines will be keyed to the time code of the video media. A viewer action—clicking on the headline or icon, or hitting the space bar on a keyboard or other user interface device—will change the messaging interface into the expanded message interface, which allows viewers to see the "body" of each message, as well as any replies to each message. If the viewer does not choose to view the expanded interface, headline comments will appear and disappear in the lower third of the screen in a manner that is well understood in the art.

An expanded message interface shrinks the display of the video to a smaller portion of the full screen, to allow space for the body text of each comment, as well as to provide a more advanced messaging system user interface controls. An "outline" view of the message headlines allows the viewer to see an overview of the available messages and the number of replies. The outline view follows the media timeline, and has a simple scrolling interface to move through the messaging timeline. The body text area changes under viewer control to allow the user to read the comments in a leisurely fashion and retain primary focus on the video media. In order to fit messages within the limited screen real estate and keep interface controls simple, there should be an arbitrary limit on how "deep" threads can go—it being recommended to limit the thread to a comment and one level of responses.

Figure 1B:
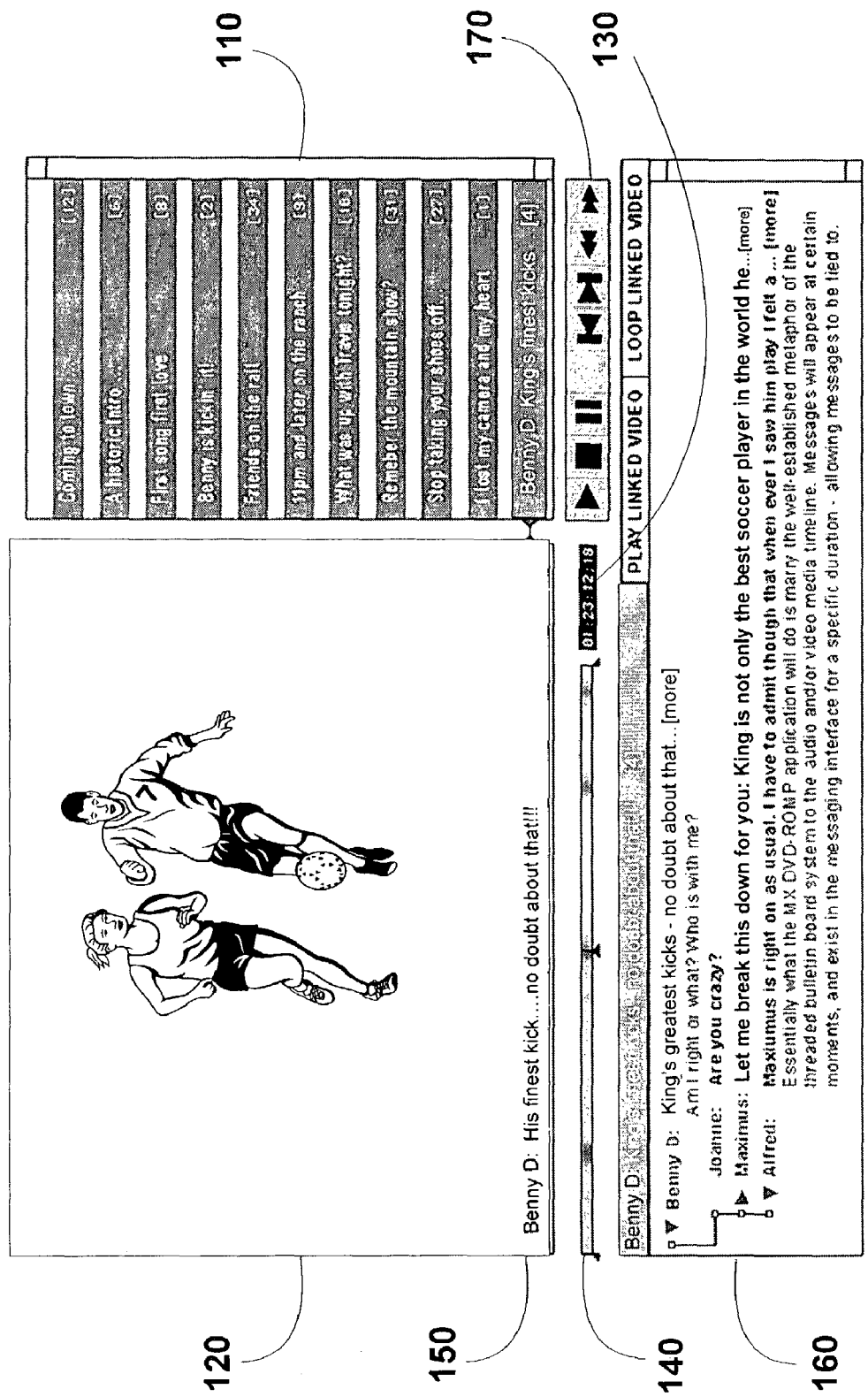
FIG. 1B illustrates presentation of alphanumeric text according to various embodiments of the present invention.

Refer now to FIG. 1B where the various subjects of messages related to an audiovisual production are displayed in outline window 110. The audiovisual production may, by way of example, be a sporting event, a theatrical performance or video of a music concert. As the audiovisual production plays back, the subject of initial messages in a threaded messaging system, appears on the display screen. If one of the message threads appears of interest to the viewer, the viewer may select a message thread by clicking on the subject headline, hitting the space bar on the keyboard, or other viewer action. Once selected, the display window for the message expands to present the body text or image of the messages associated with the selected subject. The displayed body text or image in the expanded window changes in accordance with the viewer's further directions. The expanded window also provides a viewer interface for advanced control of the messaging system. If the viewer does not select any message subject, the subject headline appears and disappears periodically in the lower third part of the display screen. An outline window 110 is located to the right of a display window 120 where the audiovisual production is displayed. Outline window 110 may be placed in other locations on the screen depending on the needs for a particular application. Outline window 110 presents subjects of initial messages and number of replies. The message subject at the bottom of the outline window 110 may have a start time code that substantially corresponds to the timeline point of the audiovisual production that the viewer is viewing. In addition, outline window 110 also provides a simple scrolling interface for the viewer to move through various subjects related to the audiovisual production. As indicated in FIG. 1B, the darkened highlight indicates that the message thread relating to the subject "Benny D: King's finest kicks" is selected. Upon selection, the timeline of the audiovisual production is changed to the start timecode of the subject "Benny D: King's finest kicks." Consequently, the playback of the audiovisual production jumps to the frame corresponding to the start timecode of the selected subject. The start timecode of the subject "Benny D: King's finest kicks" is at about 01:23:12:18 as shown in timeline clock 130 and in timeline indicator 140. Upon selection of the subject "Benny D: King's finest kicks," the first line of the initial message under the selected subject is shown in headline window 150. In addition, body text of the initial message and responses to this message are shown in expanded message window 160.

For another example, the maker of an audiovisual production may create an artist-annotated "tour" of a concert. The "tour" comprises various subjects, each of which corresponds to an event of the audiovisual production. Under each subject, the annotator would provide the viewer with an inside perspective on the corresponding event of the audiovisual production. The viewer may jump from one event to the next event of the audiovisual production by selecting various message subjects, substantially as described above.

According to another embodiment of the present invention, as shown in FIG. 1A, the subject "Benny D: King's finest kicks" has a start timecode at about 01:23:12:18 of the timeline of the audiovisual production, as indicated in timeline clock 130 and timeline indicator 140. Therefore, when the playback of the audiovisual production reaches point 01:23:12:18 of its timeline, the subject "Benny D: King's finest kicks" is automatically displayed at the bottom of outline window 110. The first line of the initial message under this subject is presented in headline window 150, and body text of messages related to this subject are displayed in expanded message window 160. Further, the playback of the audiovisual production may be controlled through viewer interface 170 with various functions such as fast forward, fast rewind, play, pause, and others. For example, the maker of an audiovisual production may create an artist-annotated "tour." With the playback of the audiovisual production, the annotator may guide the viewer through various points of timeline and provide an inside perspective on the event being shown.

According to yet another embodiment of the present invention, as shown in FIG. 1B, the viewer may select to input his own comments under a new subject or in response to an old message. Upon selection, expanded message window 160 for displaying alphanumeric text or other message content instantaneously displays the message as input by the viewer. Further, outline window 110, at its bottom, displays the message subject whose start timecode substantially corresponds to the point of timeline the viewer is currently viewing. In addition, the first line of the initial message under this subject is presented in headline window 150. For example, at about 01:23:12:18 as shown in timeline clock 130 and timeline indicator 140, the subject "Benny D: King's finest kicks" is displayed at the bottom of outline window 110. The first line of the initial message under this subject "Benny D: King's finest kicks" is presented in headline window 150.

Figure 2:
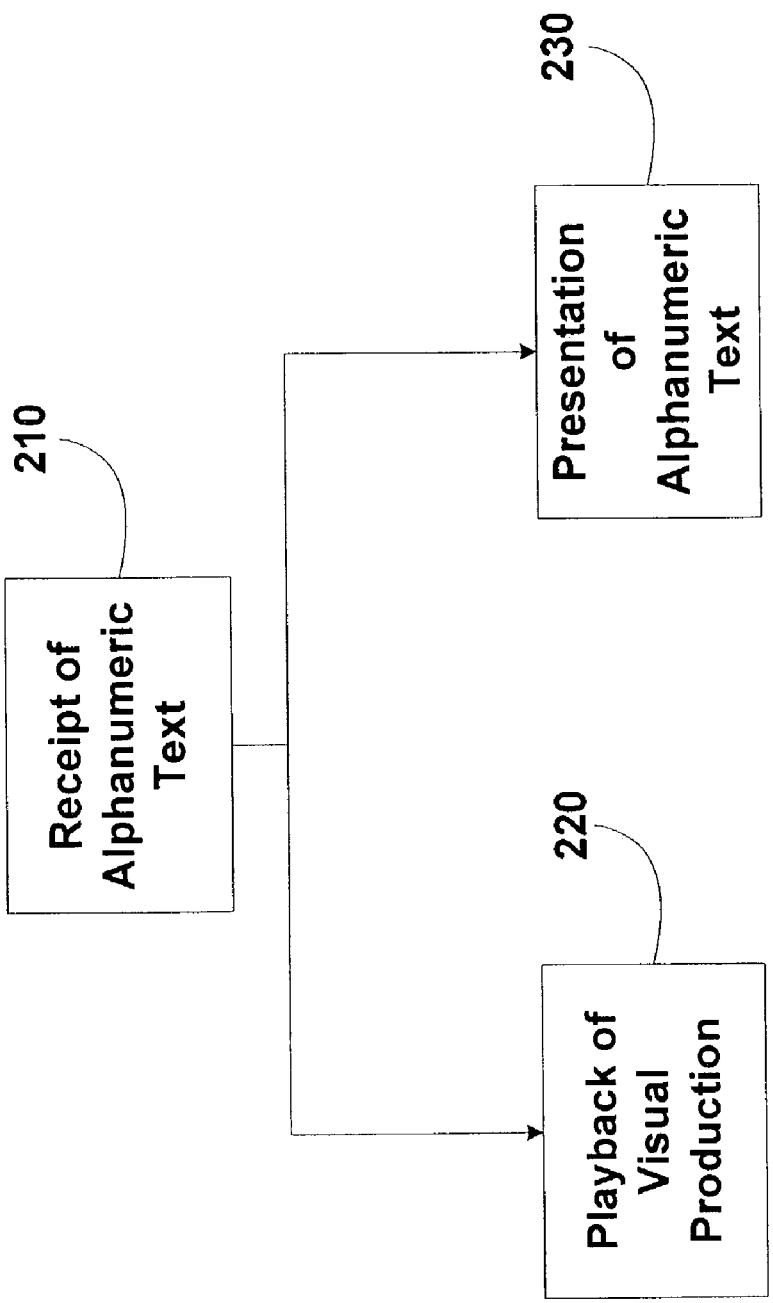
FIG. 2 is a block diagram of a method for electronic messaging synchronized to audiovisual production according to an embodiment of the present invention.

FIG. 2 is a block diagram for electronic messaging synchronized to media presentation according to an embodiment of the present invention. The method includes three processes: receipt of alphanumeric text 210, playback of audiovisual production 220, and presentation of alphanumeric text 230. As used herein, the phrase alphanumeric text includes messages that may include or other message content such as media presentation, still images or voice files. At process 210 of receipt of alphanumeric text, a display device for playback of an audiovisual production receives alphanumeric text entered by viewers of the audiovisual production. At process 220 of playback of audiovisual production, an audiovisual production is displayed. At process 230 of presentation of alphanumeric text, alphanumeric text of a message is displayed when playback of the audiovisual production is performed.

Figure 3:
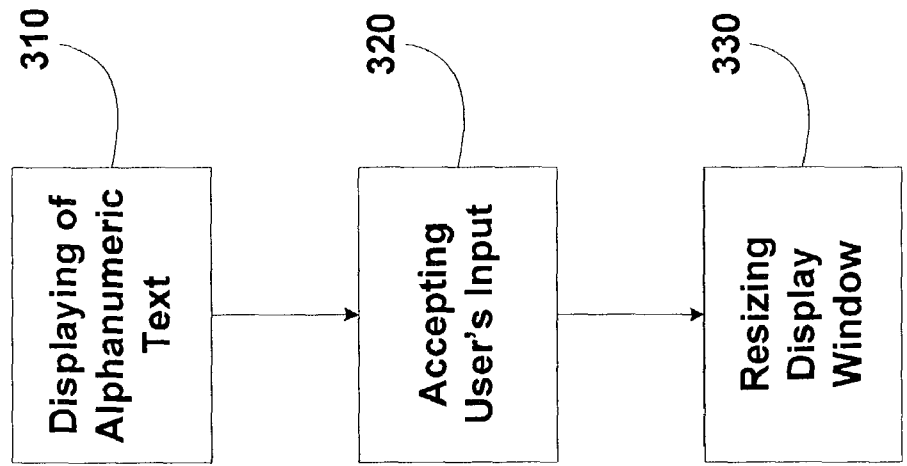
FIG. 3 is a block diagram of presentation of alphanumeric text according to an embodiment of the present invention.

According to one embodiment of the present invention, as shown in FIG. 3, process 230 of presentation of alphanumeric text comprises three sub-processes: process 310 for displaying alphanumeric text, process 320 for accepting viewer's input, and process 330 for resizing display window for alphanumeric text, display window 120 for audiovisual production, or both.

Figure 4:
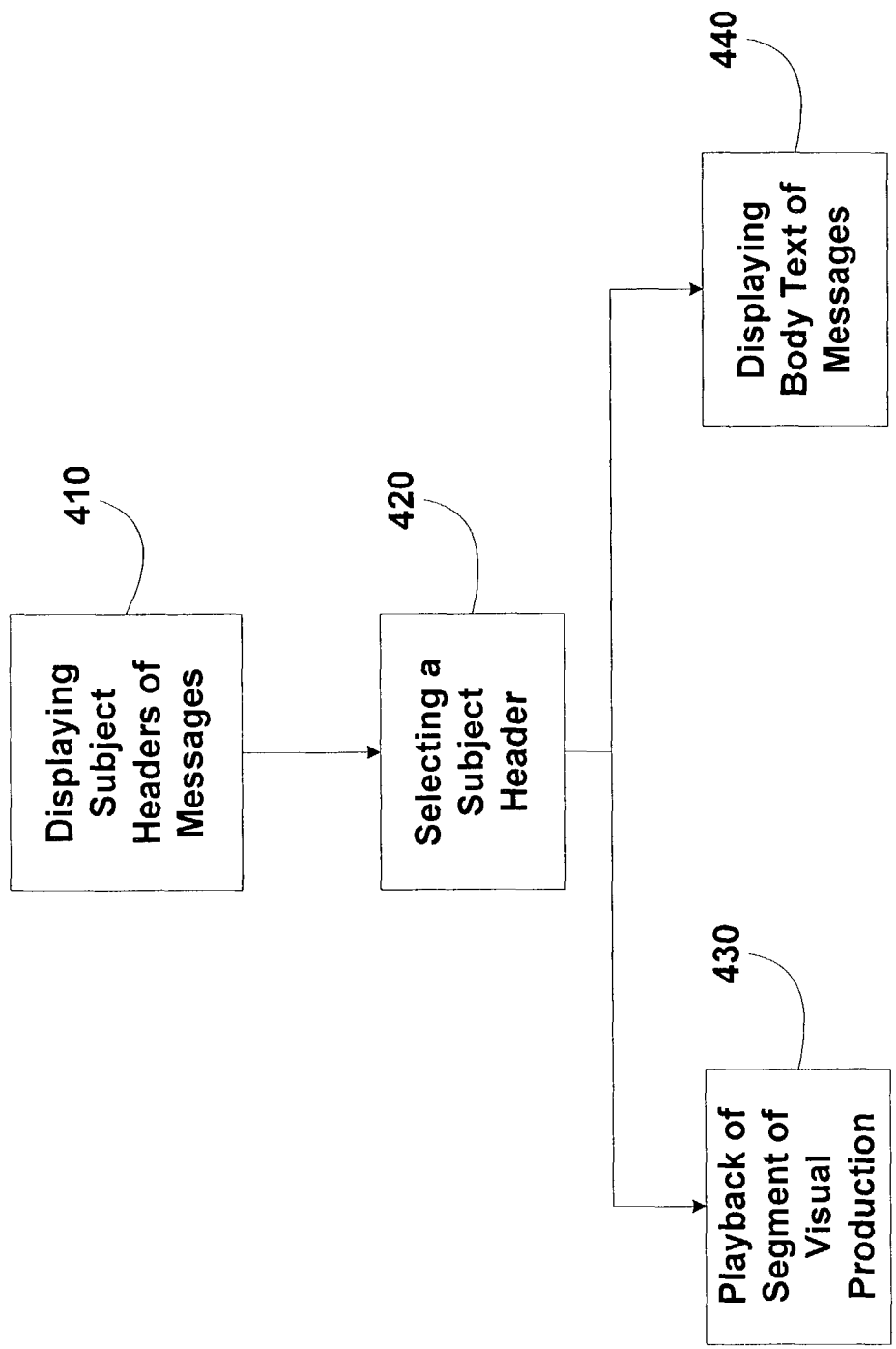
FIG. 4 is a block diagram of presentation of alphanumeric text according to another embodiment of the present invention.

According to another embodiment of the present invention, as shown in FIG. 4, process 230 of presentation of alphanumeric text comprises four sub-processes: process 410 of displaying subject headers of messages, process 420 of selecting a subject header, process 430 of playback of segment of audiovisual production, and process 440 of displaying body text of messages.

Figure 5:
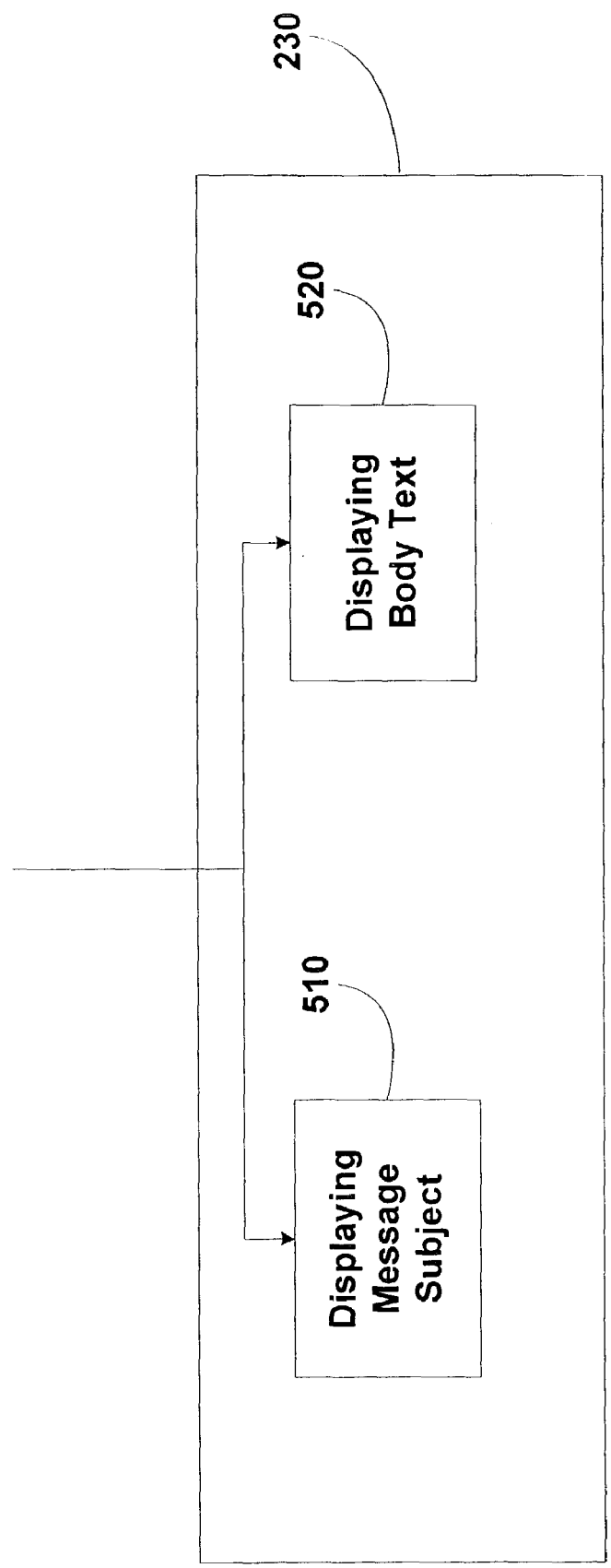
FIG. 5 is a block diagram of presentation of alphanumeric text according to yet another embodiment of the present invention.

According to yet another embodiment of the present invention, as shown in FIG. 5, process 230 of presentation of alphanumeric text comprises two sub-processes: process 510 for displaying a message subject whose start timecode substantially corresponds to the point of timeline the viewer is currently viewing, and process 520 for displaying body text of messages under this subject.

Figure 6:
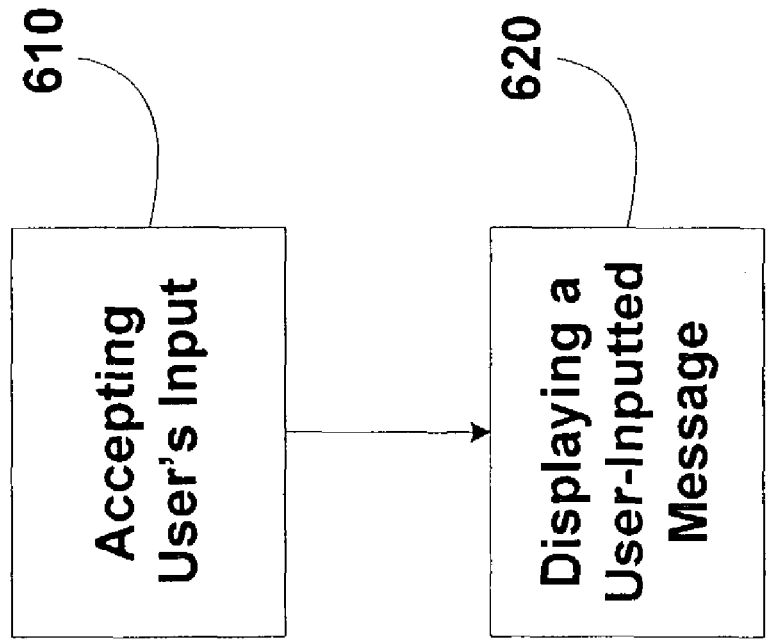
FIG. 6 is a block diagram of presentation of alphanumeric text according to yet another embodiment of the present invention.

According to yet another embodiment of the present invention, as shown in FIG. 6, process 230 of presentation of alphanumeric text comprises two sub-processes: process 610 for accepting viewer's input and process 620 for displaying viewer-inputted message.

Figure 7:
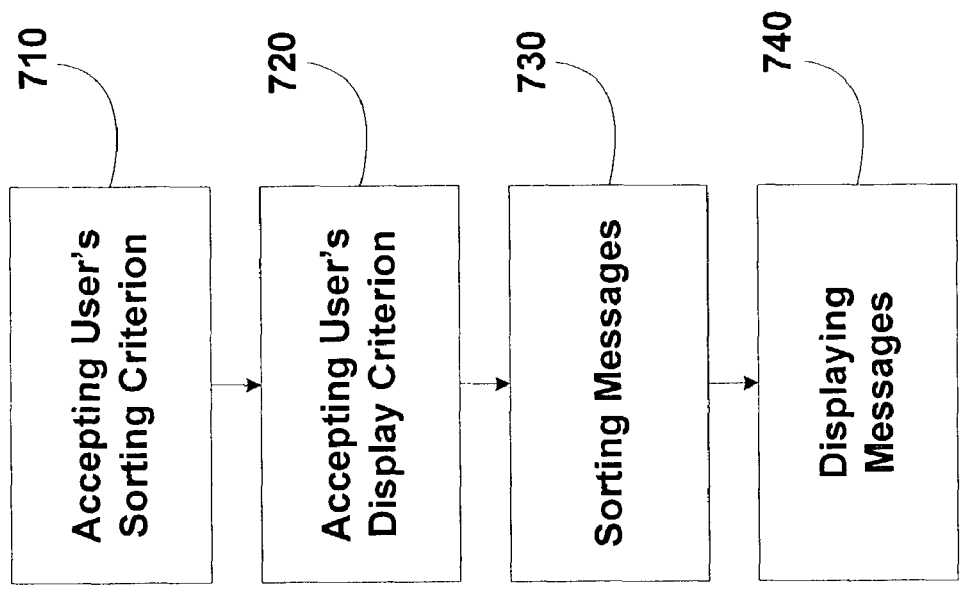
FIG. 7 is a block diagram of presentation of alphanumeric text according to yet another embodiment of the present invention.

Another embodiment of the present invention is shown in FIG. 7. A process 230 of presentation of alphanumeric text comprises four sub-processes: process 710 of accepting viewer's criterion for sorting messages related to an audiovisual production, process 720 of accepting viewer's criterion for displaying messages, process 730 of sorting messages, and process 740 of displaying messages according to the sorting result. These sub-processes may be implemented in conjunction with various processes described in various embodiments, as shown in FIGS. 1-6.

When a user inserts an encoded DVD, computer code recognizes the encoded information and automatically contacts a messaging server. The DVD display platform (such as a computer system having a DVD player and a display) requests a top-level index consisting of a list of media files on that DVD that have messages, as well as the location of the subject headline index for each piece of media recorded on the DVD. A predictive process attempts to pull down the headline index for the "most likely" first-viewed piece of media, which contains the subject headings along with the start and end time codes for each piece of media, so that the response time of the messaging application will appear to the viewer as more or less instantaneous. As the viewer selects to view any particular segment of the audiovisual production, a headline/time code index for each production is downloaded and stored to a local disk cache associated with the DVD platform. Preferably, the cache is persistent so that once an index has been downloaded it is available for future use. The cache can subsequently be compared to the message server indexes to determine if any updates have occurred since the last play of the disc. Another predictive process will be employed to "pre-download" upcoming body text, so that the entirety of each message is available precisely at the start time of the event. As the starting time codes of message events continue to pass, the application will download body text, and store it in the local disk cache awaiting user action. As ending time codes pass, the headlines will be removed from the main user view, though message headlines will always be available for perusal through a simple back/forward interface independent of media rewind/fast-forward.

The present invention tracks the playback time code at all times, and follows as closely as possible a viewer's interruption of the normal playback timeline. For example, if a user fast-forwards or rewinds normal playback to a new time code, the headline display window will show the headlines appropriate for that time code. When a viewer clicks the action item of any headline, the body display window will show the full text of that message. The display of the body of any message will stay persistent until user action replaces it with a new message in order to allow the user to read the full text of the message. The message body section has a simple back/forward interface independent of media playback, similar to the headlines, and it further includes the control mechanism to reset the media playback to the start and/or end of the displayed message event. Thus, the viewer may jump to a particular time code after they have had the time to read the text of the message.

Figure 8:
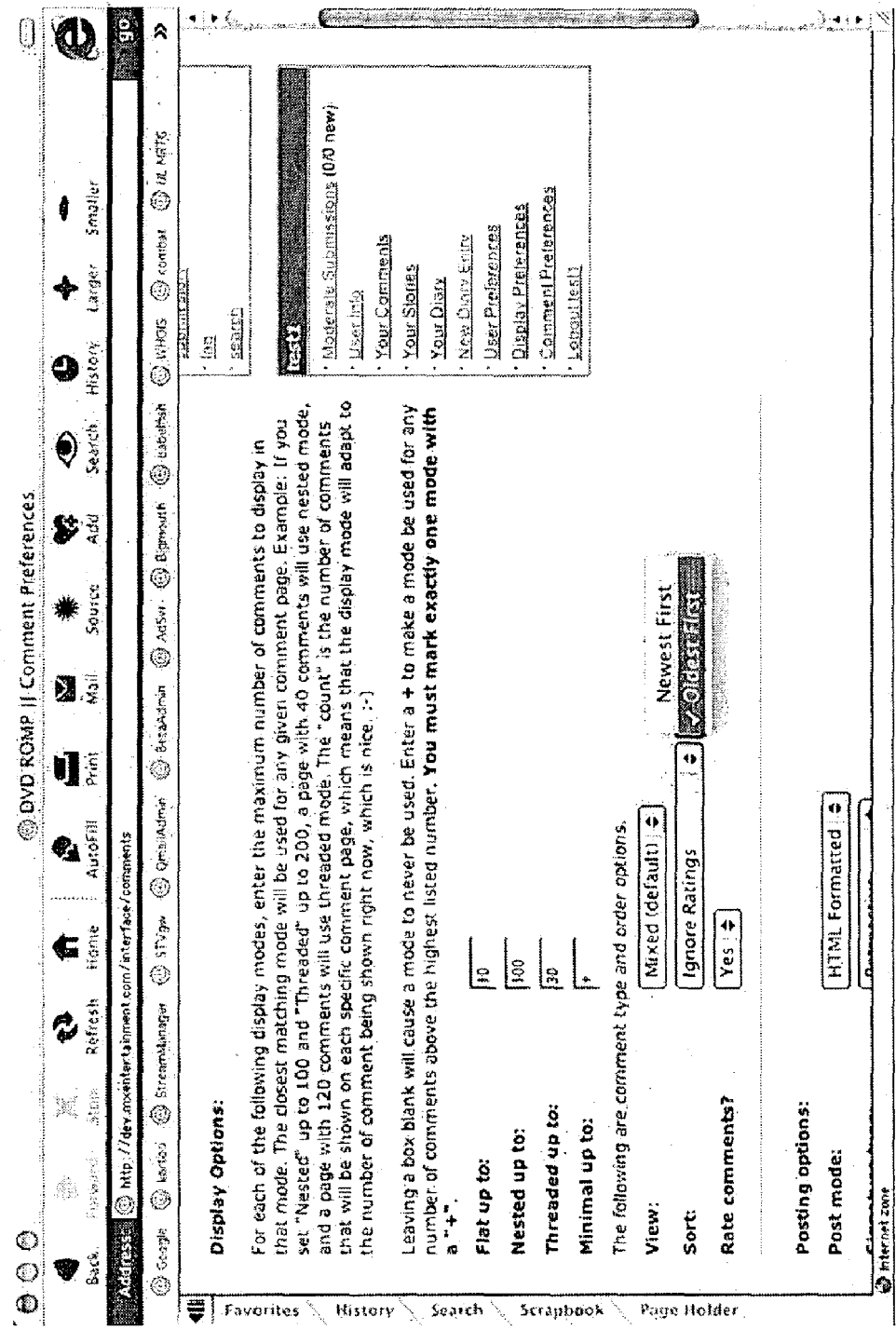
FIG. 8 illustrates a viewer's sorting criterion according to yet another embodiment of the present invention.
Figure 9:
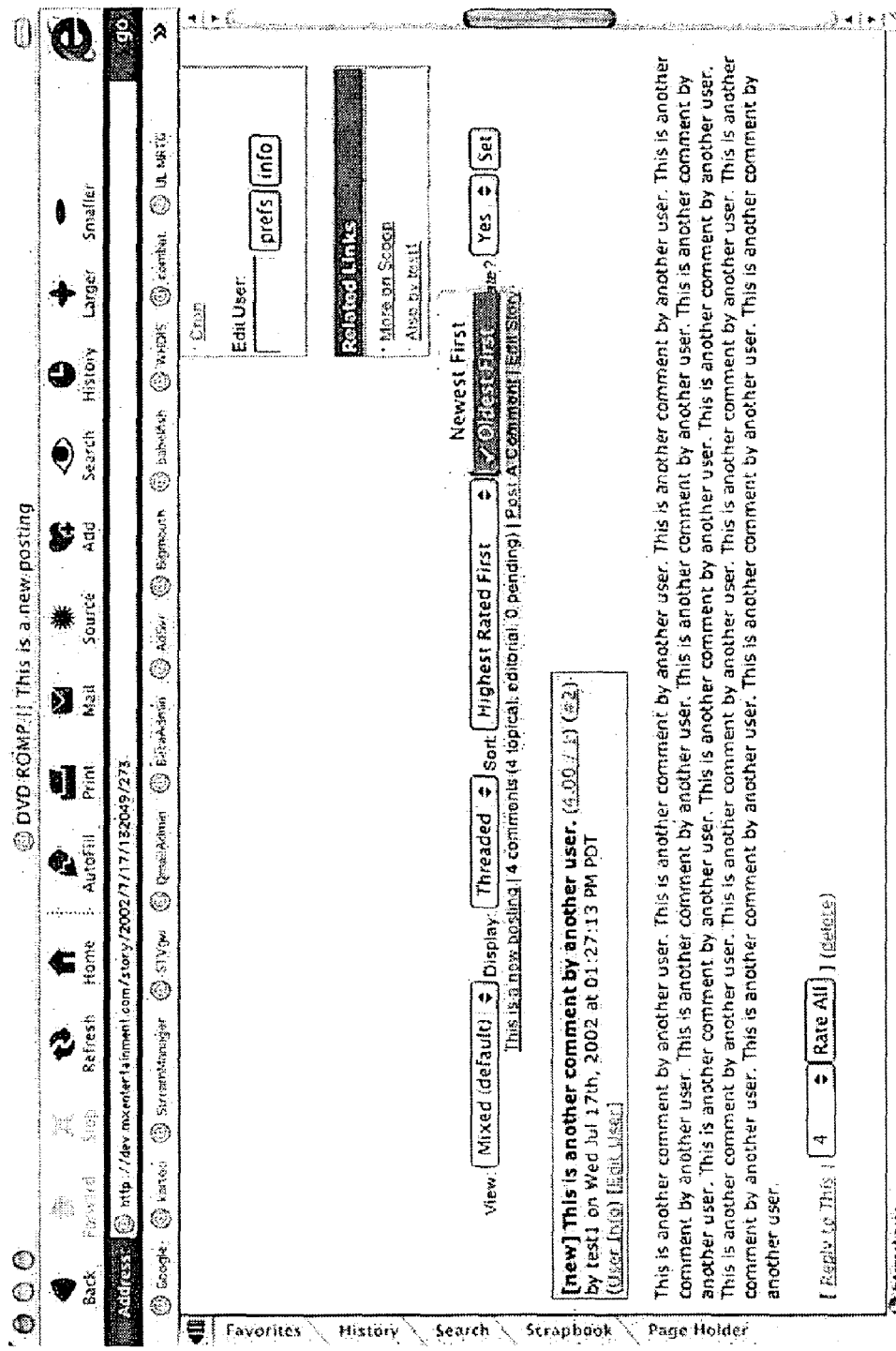
FIG. 9 illustrates another viewer's sorting criterion according to yet another embodiment of the present invention.
Figure 10:
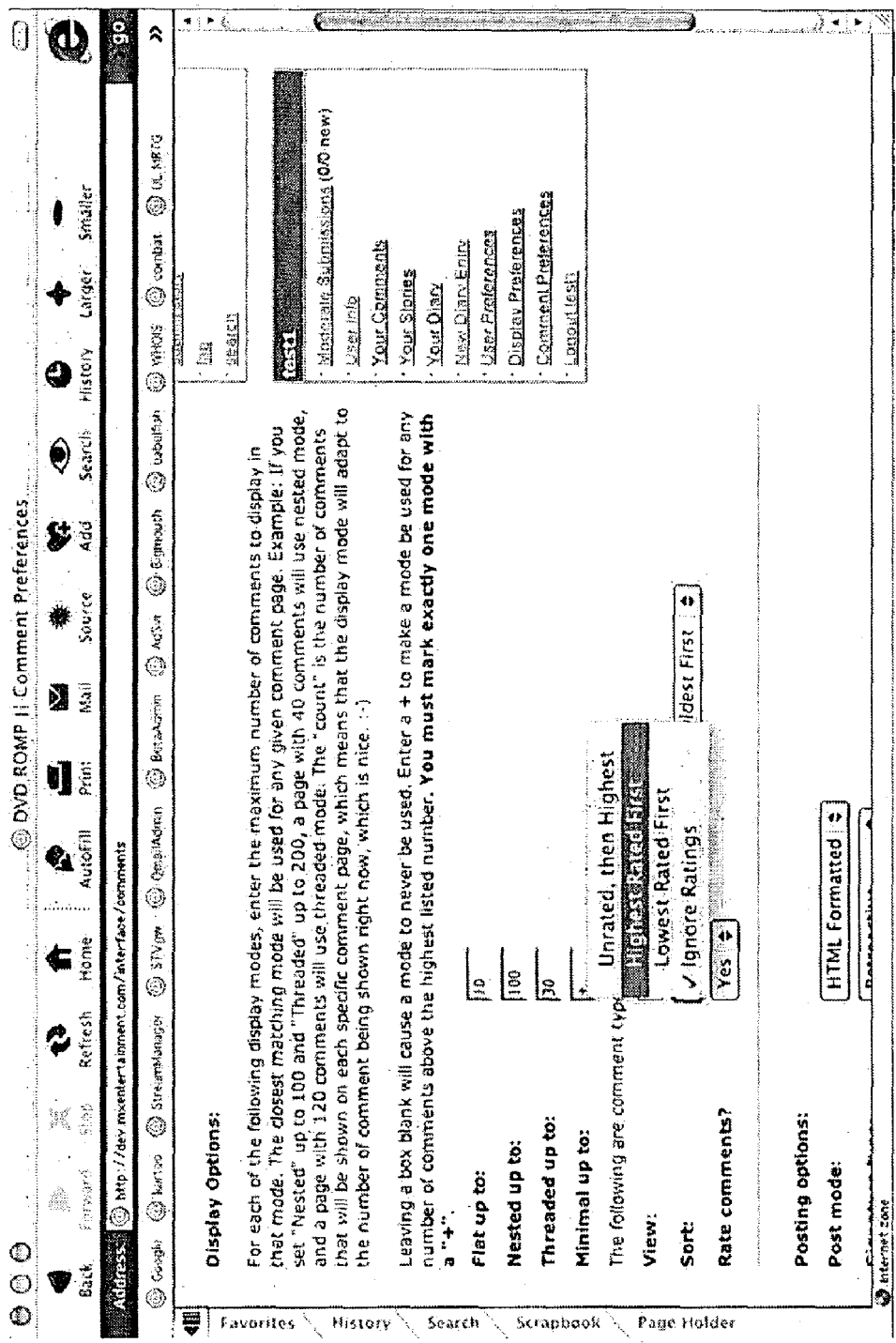
FIG. 10 illustrates yet another viewer's sorting criterion according to yet another embodiment of the present invention.
Figure 11:
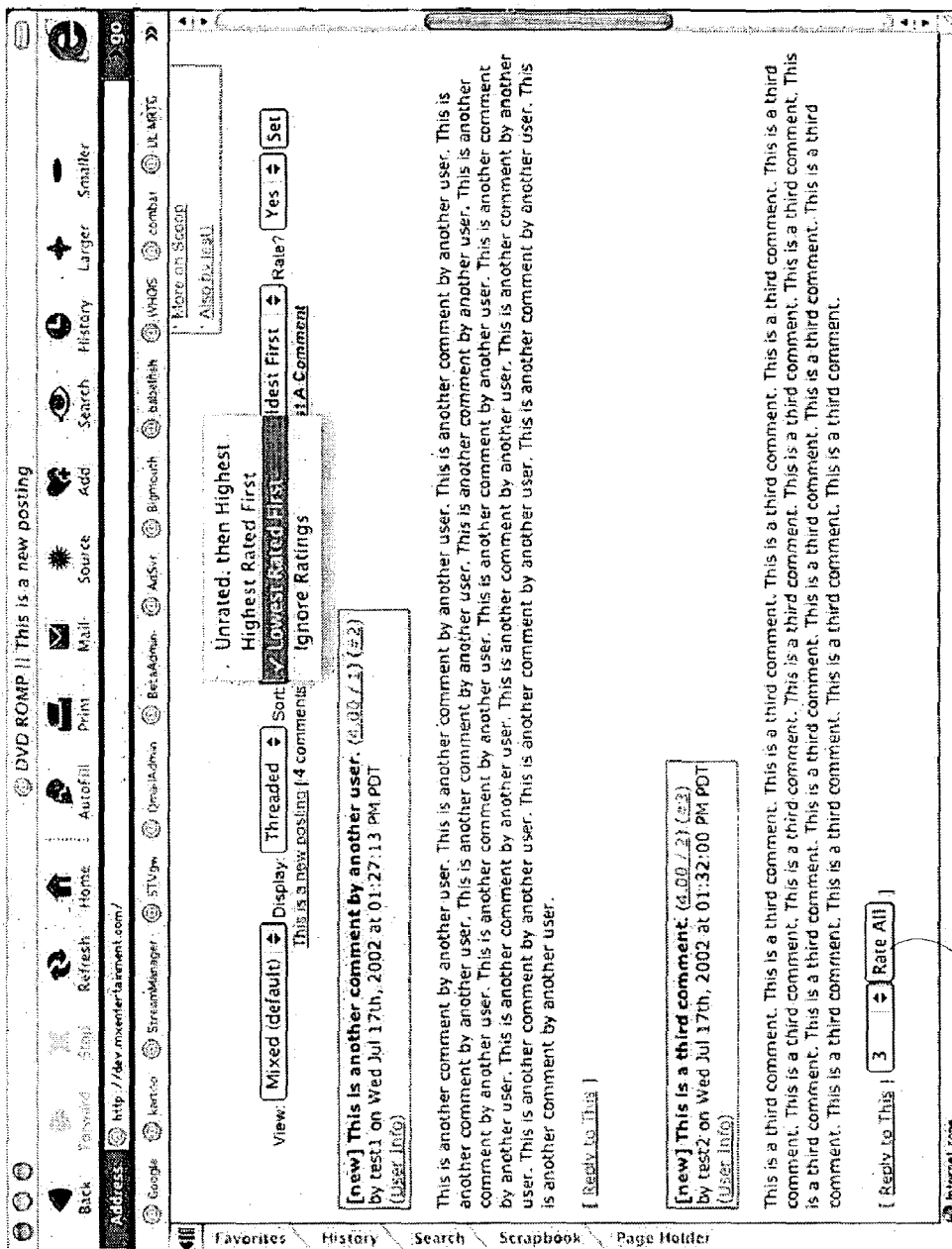
FIG. 11 illustrates yet another viewer's sorting criterion according to yet another embodiment of the present invention.

At times, the viewer may desire to sort messages and selectively filter out some of these messages. As shown in FIG. 7, at process 710, the display device receives viewer's sorting criterion. The sorting criterion may be by message ages as shown in FIG. 8, age of messages under the same subject as shown in FIG. 9, ratings of messages as shown in FIG. 10, ratings of messages under the same subject as shown in FIG. 11, ratings of authors, or other criterion or combination thereof. Ratings of messages reflect feedbacks of readers on quality of messages. Ratings of authors reflect cumulative ratings of messages sent by particular authors. Viewers may enter their rating by selecting a Rate It button such as shown at 1120 in FIG. 11.

At process 720, the display device receives the viewer's display criterion, such as displaying only messages sent by a particular author, displaying only messages with ratings higher than a threshold, or displaying only messages sent by authors whose ratings higher than a threshold. At process 730, the display device sorts messages according to the sorting criterion as described above. At process 740, the display device displays only messages that satisfy the display criterion.

Rating of messages and rating of authors as discussed above gains importance as the present invention grows in popularity. The amount of messages may grow to a point where it would not be possible to properly experience each and every message event in any given subject category. The viewer would need to be able to selectively filter out the messages. For example, the viewer may want to follow messages only by a particular author, e.g., a friend or an artist associated with the audiovisual production, or messages under a particular thread. In addition, the viewer may need to not only rate fellow viewers as to quality of their postings but also filter out messages based on ratings. A threshold system that allows the viewer to select a level below which messages are filtered from the interface is recommended. As the viewer posts messages, other viewers or a system administrator can rate the quality of these messages, and the ratings may provide a cumulative score for each viewer. Viewers of the messages would then be able to select a score below which they do not wish to view, and thereby effectively filter out garbage or irrelevant comments. In addition, the artist and/or a record label may give a viewer additional points to his or her rating, and thus raise the viewer to prominence in the community. The record label may also bless a particular author, e.g., an artist associated with the audiovisual production, so that his or her messages are always available for viewing regardless of the viewer's threshold filter setting.

Figure 12:
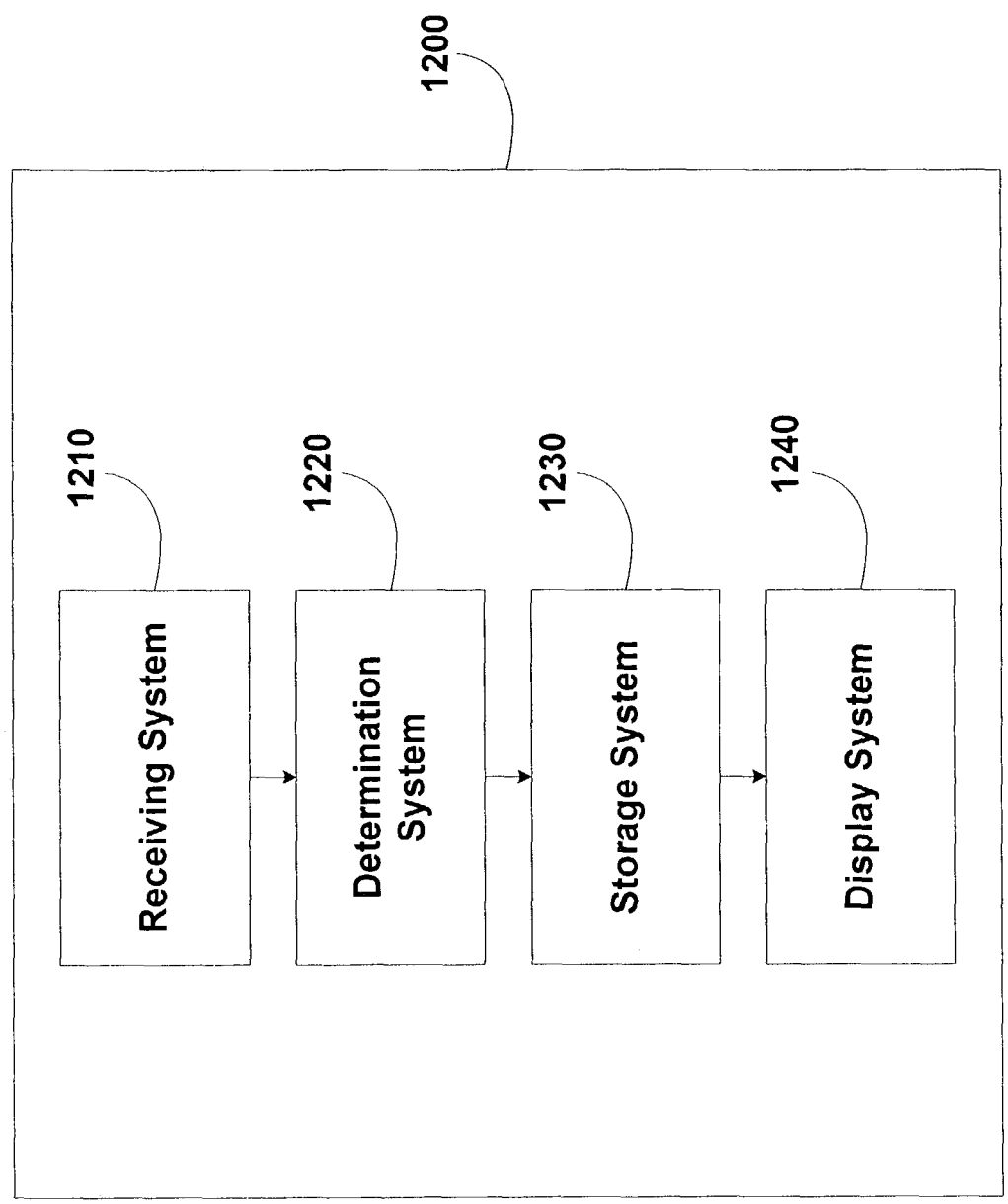
FIG. 12 is a block diagram of a system for electronic messaging synchronized to audiovisual production according to an embodiment of the present invention.

FIG. 12 is a block diagram for a system 1200 for electronic messaging synchronized to presentation of the audiovisual production, according to an embodiment of the present invention. System 1200 comprises four sub-systems: receiving system 1210, determination system 1220, storage system 1230, and display system 1240. System 1200 can perform various methods of electronic messaging synchronized to media presentation as described above in FIGS. 1-11. Receiving system 1210 receives inputs from a viewer interface to define display of a message containing alphanumeric text, still photos or a voice message file during playback of an audiovisual production. The inputs may include viewer's command for resizing display window for alphanumeric text or other messages, viewer's command for resizing display window for audiovisual production, viewer's command for selecting a particular message subject, viewer's input of comments on an audiovisual production, viewer's input of criterion for sorting messages, viewer's input of criterion for displaying messages, or other viewer input.

Determination system 1220 associates a message with a point of timeline in playback of an audiovisual production. For example, a message may associate with the audiovisual production according to the start timecode of the message, the end timecode of the message, or other characteristic of the message.

Storage system 1230 stores the message along with its association with a point of timeline for an audiovisual production. The storage may be performed on a storage device remotely located from the display device of the audiovisual production, on a local disk cache of the display device, on other device, or combination thereof.

Display system 1240 displays a message during playback of the audiovisual production. The display of the message may occur at its associated point of timeline of the audiovisual production or at any time independent of playback of the audiovisual production.

In another embodiment, each message includes an embedded icon. The icon is linked to a specific location in the playback of the audiovisual production. When the icon is selected, playback jumps to specific location of the audiovisual production that the icon refers to and initiates playback of a defined portion of the audiovisual production. For example, beginning and ending points can be specified for the defined portion. More specifically, when a viewer is reading a message, it is possible to select the icon and immediately jump to the corresponding location in the audiovisual production. Playback proceeds by playing a selected portion, or a clip, of the audiovisual production. Often, a viewer will explore an audiovisual production by first reading messages and then pre-viewing portions of the production by clicking on one or more icons in the messages to pre-view specific portions. To illustrate this feature, a viewer may read messages that critique an audiovisual production and then jump to view several defined clips identified by the message before deciding whether to initiate the playback of the entire audiovisual production.

The message icon represents a specific location on a specific DVD that can be specified by the author of the message. In one preferred embodiment, a software tool executing on a computer associated with the messaging device enables the creation of a message icon and establishing the link to a specific portion of the audiovisual production. The messaging device may be a computer system, cell phone, PDA or other computer-based viewer interface system.

Figure 13:
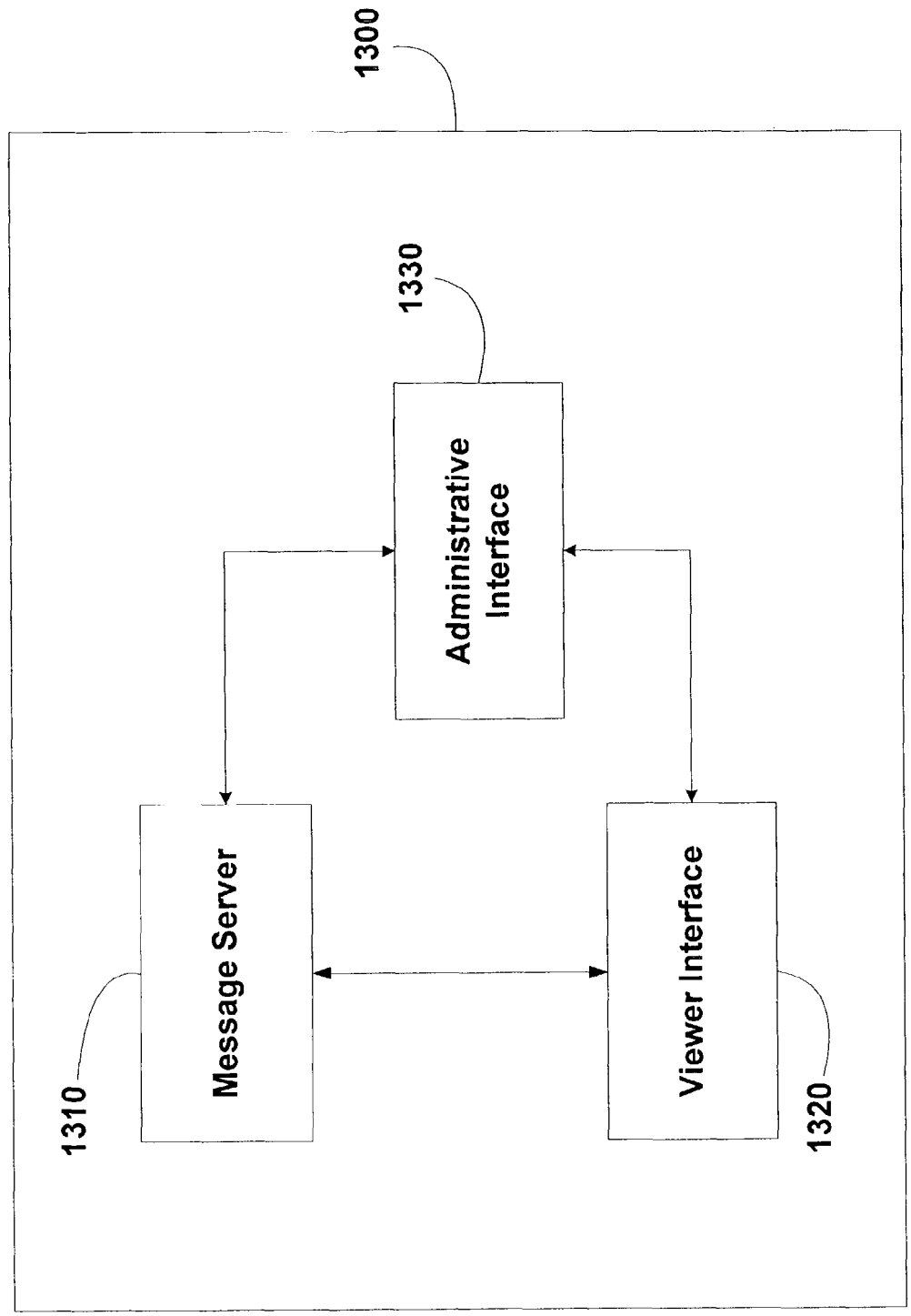
FIG. 13 is a block diagram of a system for electronic messaging synchronized to audiovisual production according to another embodiment of the present invention.

According to yet another embodiment of the present invention, FIG. 13 is a block diagram for a system 1300 for electronic messaging synchronized to media presentation. System 1300 comprises messaging server 1310, viewer interface 1320, and administrative interface 1330. System 1300 may include some or all four subsystems of system 1200.

Messaging server 1310 preferably includes a standard database-driven threaded messaging system, enhanced with an identification of the DVD audiovisual production (DVD ID) and the start/end time codes for each message. The use of a standard servers and database affords great flexibility in delivering future functionality, and allows traditional, browser-based interaction with the database of messages. In this manner, message threads are readily integrated with streaming media versions of the audiovisual production that allows a DVD-like experience of the time-based messaging system on the Internet. The messaging database is preferably separate from any pre-existing user database, in order to foster modularity in implementation. By using existing open-source messaging server code, a consistent application program interface (API) is provided together with a framework for future feature enhancements while preserving backwards compatibility. Open source software also allows for easy customization, so integration of additional time code/DVD ID tags that are necessary to allow the messaging system to interact with third party media content.

In addition to the DVD ID and start/end time code tags (or other indicators) that need to be present for each thread, the present invention contemplates the use of a user "karma points" system in which each contributing viewer is assigned a rating. The rating functionality only needs to be employed where the messaging system is open to end-users. If the DVDs that employ the messaging system are limited to officially created artist "tours" there is no need to make use of the rating system functionality. In one preferred embodiment, a user's rating is determined by the community of viewers where every message allows viewers to rate the quality of its content, and every message author will accumulate a good or bad rating based on the judgment of the community.

Messaging server 1310 may employ various types of messaging systems such as instant messaging system, chat room systems, email systems, message board systems, standard database-driven threaded messaging system enhanced with DVD ID and start and end time codes for each message, or other messaging system. The standard messaging system provides the viewer with browser-based interaction with the message database and facilitates integration of the message database with streaming media versions of audiovisual productions. This integration provides the viewer with playback of an audiovisual production that is downloaded over the Internet and display of messages associated with the audiovisual production. In addition, the standard messaging system also provides flexibility in delivering additional functionality.

Viewer interface 1320 may provide various display windows configurations upon viewer's selection. The display windows include those for audiovisual production, for body text of downloaded messages, for body text input by the viewer, for various message subjects, for message filter, for viewer login, and other information and control display.

After a viewer logs in viewer interface 1320, viewer interface 1320 first presents default display windows. The default display windows comprise one for audiovisual production and one for message subjects associated with the audiovisual production. When the audiovisual production plays back, the message subjects associated with the audiovisual production are also be displayed. The message subject at the bottom of the list usually substantially corresponds to the point of timeline that the viewer is viewing. Further, viewer interface 1320 provides means for the viewer to scroll up and down the subject listing. Clicking on any message subject brings body text of messages under this subject into the expanded message window. At substantially the same time, playback of the audiovisual production jumps to the point of timeline corresponding to the selected subject.

On viewer interface 1320, the display window for the audiovisual production may take up most or other percentage of the available screen real estate. Icons for controlling playback of audiovisual production may be displayed in the display window. Alternatively, the stream of messages and control icons may appear in the lower third part of the screen real estate. The control icons allow the viewer to view body text of messages and to enter viewer's comments in expanded message window for alphanumeric text. The expanded message window may provide only two or three lines of body text of each of the messages in a large and readable font. A slow "auto scroll" effect may be employed should any body text extend beyond the viewable range of the expanded window in order to minimize the need for viewer interaction when the viewer is viewing the audiovisual production. The window for displaying body text and the window for entering the viewer's own comments may be similar. For both types of windows, authors and headlines of messages may be presented along with body text of the messages with a slow "auto-scroll" effect. When the display window for entering viewer's own comments is selected, the viewer interface may also provide controls for the viewer to associate the composed message to a specific point of timeline for the audiovisual production. In addition, on viewer interface 1320, controls for replying to displayed messages, for rating the messages, and for drafting a message under a new subject may also be displayed.

In addition, a timeline indicator, a timeline clock, or both may appear below the display window on viewer interface 1320 for audiovisual production. The timeline indicator 140 and the timeline clock 130 (see FIG. 1) show the point of the timeline at which the audiovisual production is currently being displayed. Clicking on the timeline indicator allows the viewer to navigate to points of the production more easily than using the standard rewind and fast-forward controls.

An administrative interface is also provided to raise or lower a given user's rating if the artist and/or label so desires. Administrative interface 1330 may provide several sub-interfaces that perform various administrative functions. These sub-interfaces comprise subject category selection interface, administrative filtering interface, administrative login interface, and administrative rating interface. Subject category selection interface provides a simple method for selecting subjects of messages the viewer desires to follow. Administrative filtering interface provides a simple method for selecting a rating "threshold." Any messages with a rating below this threshold would not be displayed. In addition, administrative filter interface may also provide a simple method for selecting any particular author whose messages the viewer desires to follow. Administrative login interface displays viewer name and password entry fields. When a viewer logs in to the system for the first time, the viewer may select a "screen name" or an alias, by which the viewer is known to other viewers in the system.

The rating system will discourage "graffiti"-like postings where the poster has nothing appropriate to say, and encourage posts that are thoughtful and relevant to the topic. The user rating may also be employed to control access to posting messages—i.e. a user who is rated poorly may be blocked from posting further messages, or their access to post messages in certain forums might be curtailed. In addition, the user level can be employed to filter out display in the main video window of the interface when the number of messages in the system increases and there will be too many to display and perceive properly. An algorithm operating on the messaging server gives priority to comments from users that have higher ratings—again encouraging quality posts. Administrative rating interface allows raising or lowering a viewer's rating. The viewer's rating may be employed to control access to posting messages. For example, a viewer with a poor rating may be blocked from posting messages, or their access to posting messages in certain forums may be curtailed.

In addition, the start timecode and end timecode for some messages may be only a few seconds apart. Therefore, the viewer may not fully understand body text of these messages before they are replaced by subsequent messages. Consequently, according to yet another embodiment of the present invention, the system would set a minimum time that each message must appear on screen. If the system determines that within the minimum time, the messages being displayed would overlap with subsequent messages, the messages possessing certain characteristic, such as being composed by authors with high ratings, are displayed.

Moreover, when a message subject draws strong interest from viewers of the system, this message subject creates a "hotspot" in the timeline of the audiovisual production. At a hotspot, a large number of messages aggregate within a short period of the timeline. Consequently, displaying all of these messages in the limited screen real estate may be difficult. Hence, the number of displayed messages would preferably be limited. For example, only messages composed by highest rated authors are displayed, even if an individual viewer's rating threshold is set lower. In contrast, when messages at a point of timeline are sparse, messages by composers with low ratings may appear, so long as the composers' ratings exceeds the viewer's rating threshold.

Communication between the messaging server 1310 the Administrative Interface 1330 and the Viewer Interface 1320 take place preferably within an encrypted channel that may also be used to send tour calendar, viewer demographic, and usage profile information. An intermittent connection between the message server and database and the DVD platform is attempted every time a DVD is launched. The connection stays persistent only as long as is required to register and upload user/demographic data. However, a more persistent connection to the database is required so that the messages entered by users can be updated in a fashion approaching real-time chat. Also, as the message boards grow larger, the amount of data transfer required to download an entire message board may become impracticable over typical modem connections. However, a real-time, persistent connection presents challenges in application design, as well as scalability so the preferred method is that a hybrid of one-time download and persistent connections will be employed. Message board subject indexes and headline titles are downloaded at launch when a user logs into the system—and then the full text of messages can be downloaded as necessary.

A program code may be implemented to instruct a computer system, a consumer digital device, a central processor-based device, a custom circuitry or other device to perform various processes of present invention as discussed in FIGS. 1-11, including receipt of alphanumeric text, playback of audiovisual production and presentation of alphanumeric text. In addition, the computer code may also instruct a device or a system to perform various functions as described with respect to FIGS. 12 and 13.

Figure 14:
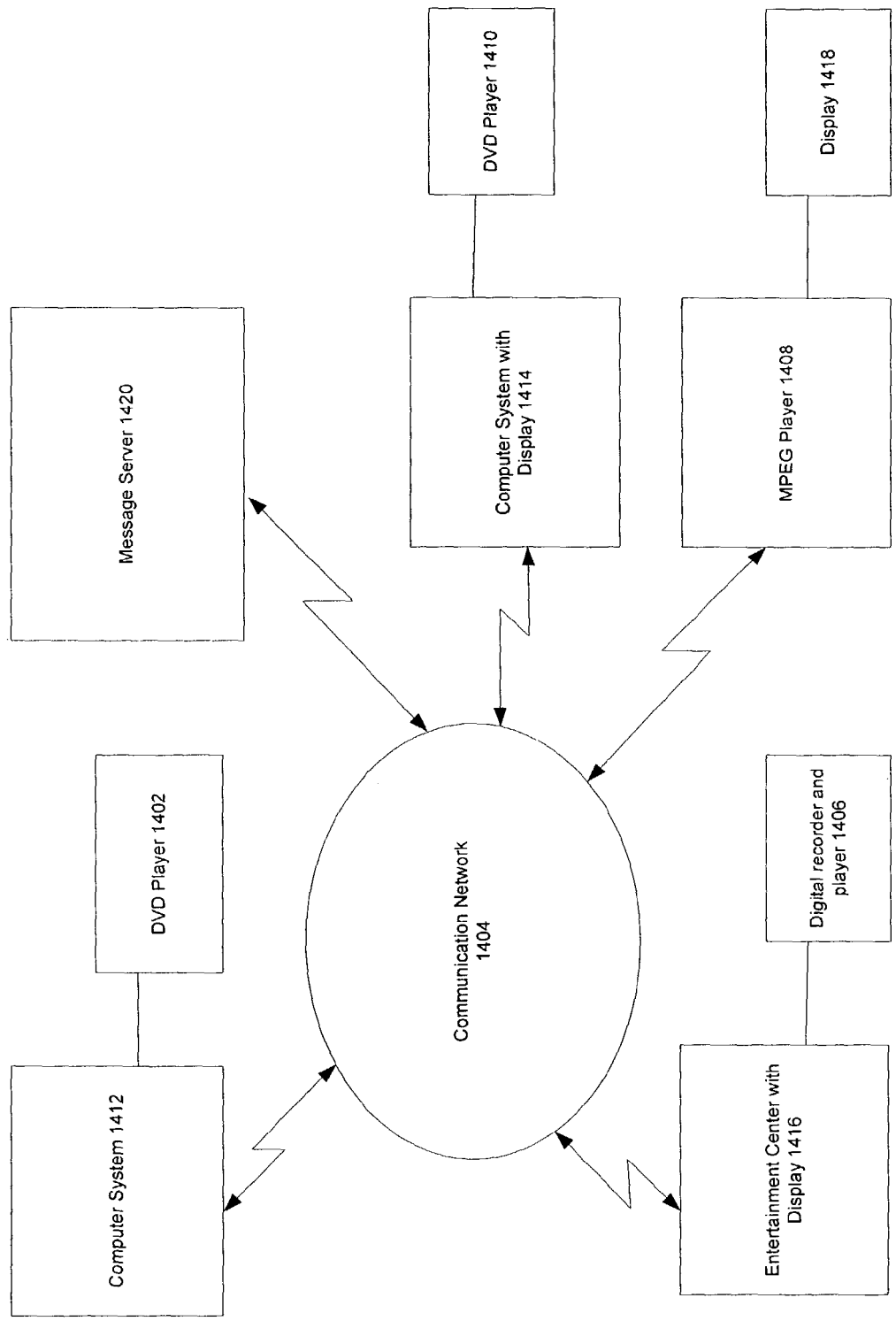
FIG. 14 illustrates a system configuration for implementing a master DVD player controlling a plurality of slave DVD players.

Another embodiment of the present invention is shown in FIG. 14 where a master computer coupled to a first DVD player 1402 is further coupled by a communication network 1404 to one or more other DVD players, such as represented by stand-alone DVD player 1406, MPEG player 1408 and DVD player 1410. Communication network 1404 is preferably the Internet or other worldwide communication network that enables digital transmission of audiovisual productions from one communication device to many communication devices. In this embodiment, the playback of a DVD at a master display system, comprising by way of example DVD player 1402 and computer system 1412, is synchronized with the playback of the same audiovisual production stored on DVDs at slave playback devices such as DVD players 1406-1410. Although players 1406-1410 are denominated as slave players, it will be apparent to one skilled in the art that any one of such players may at some subsequent time be designated as the master player and player 1402 designated as a slave player.

The player having the designation as 'master' and the control of all slave players may be transferred from the current master to any one of the slave players by passing a token 1414 from the master to the slave. If more than one slave has an outstanding request for token 1414, the token may be passed in a round robin fashion. During other audiovisual presentations, two or more DVD players may exchange the token in a 'ping-pong' fashion. This type of token transfer may be particularly useful in a panel discussion where different portions of the audiovisual presentation is germane to different panelists. Regardless of the manner used to pass the token, whoever has the token may decide to retain the token for the entire duration of the audiovisual performance in which case the other DVD players remain in slave mode.

As illustrated in FIG. 14, each of the DVD players may be of various types and designs. For example, players 1402 and 1408 are coupled to computer systems 1412 and 1414, respectively, each of which includes a user interface and a viewing device such as an LCD display. Other DVD players, such as digital recording and player device 1406, such as is commercial available under the brand name "TiVo," may be a recording and playing device having controls on the front face of the device and the audiovisual production is displayed on an associated digital TV such as found in most home theater systems 1416. One requirement for standalone DVD players is that the device provides an Internet connection. Still other DVD players may be a MPEG player 1408 examples of which include commercially available game consoles capable of playing a DVD and connecting to the Internet such as the Sony PlayStation®, Microsoft X-Box® or Nintendo Game-Boy®. MPEG player 1408 is typically coupled to a display device 14 such as a television although player 1408 further may include a small LCD display 1418.

The system illustrated in FIG. 14 further includes a messaging server 1420 that provides a chat room for viewers wishing to participate in a presentation. To initiate a group presentation, an initiator solicits participants by identifying the audiovisual work to be discussed and the time for initiating the presentation. Other viewers may join the presentation by indicating their desire to participate. Messaging server 1420 creates a list of viewers and their respective IP addresses. Each viewer is then advised to place a DVD disk containing the audiovisual presentation into his or her DVD player. If appropriate control software is not present on the computer associated with each DVD, server 1420 provides the software so that each DVD player may be controlled in a slave mode.

At the start of the presentation, the master DVD player 1402 checks for the presence of the audiovisual presentation at each slave DVD player and initiates the playback of the master DVD and each of the slave DVD players. During the playback, each viewer may submit electronic messages to the moderator or moderators. If the message requires the moderator to change the normal sequence of the playback, the appropriate controls are entered at the master DVD player and transmitted via the communication network 1404 to each of the slave DVD. To illustrate, if a viewer at DVD player 1408 asks for clarification of a point in the audiovisual presentation, that message may be sent to the moderator at master system 1412 and each of the other viewers on their displays. If the moderator decides that it is desirable to pause the audiovisual presentation, a pause command is sent to the master DVD as well as each of the slave DVD players. Similarly, so long as the moderator retains the token designating his or her system as the master system, the moderator retains control over each slave DVD. Thus, the moderator can initiate play, pause, jump to a specific time code of the audiovisual presentation in a non-sequential manner at each slave computer.

During playback of the audiovisual production, server 1420 associates messages stored in its local memory with a corresponding time code. These messages may be communicated to the master and each slave display upon detection of the corresponding time code during playback of the audiovisual production.

Since server 1420 manages the participation of each slave DVD, a viewer may disconnect from the presentation at any time and the master DVD will no longer control his or her DVD. This embodiment enables on-line collaboration relating to an audiovisual production between two or many viewers. Advantageously, many viewers can chat live about the content of an audiovisual production because viewers are watching it together.

If there are two or more moderators, server 1420 may receive requests from the moderators for the token. The token may be passed by updating the viewer list maintained by server 1420 such that only the new master DVD may control the slave DVDs. This approach is especially useful where people are collaborating online about video edits to an audiovisual production when working from a rough edit on DVD or where DVDs are distributed to many viewers and the DVD is the passkey that authorizes the viewer to participate in the presentation.

With device 1406, a viewer may record a television show, sporting event or movie when aired on cable or television channels. At a subsequent point in time when it is convenient for the viewer to view the recorded show, event or movie, a communication link is established with message server 1420 and message links are downloaded and attached to the recorded show, event or movie for viewing. Further, instead of using a DVD or computer disk for media storage, the audiovisual production may be transferred to a display device from a remote source, such as a media server computer, by way of a cable or satellite communication system.

Although the invention has been described primarily with respect to playback of productions from a DVD, any storage media or playback technology, such as Video-On-Demand cable or satellite systems can be used as the source of the audiovisual production. Further, the DVD playback device and the messaging device can be separate devices. For example, a cell phone or personal digital assistant (commonly referred to as a PDA) can be used as a messaging and control device while the audiovisual production is playing on a remote DVD player connected to the Internet.

Also, although a client-server architecture has been described, other network arrangements such as peer-to-peer can be used. In general, any type of network and arrangement of processors, e.g., computers, consumer electronic devices, central processor-based devices, and custom circuitry, can be used for transmission of data, playback, execution of a viewer interface and to perform any of the functions and features described herein. Processing can be performed at any physical location and can be done by a single processing unit, or in a co-processing or parallel arrangement with multiple processors. Further, although time codes for messages have been described, any other types of time indications that associate the messages to points in time of an audiovisual production may be used.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed. Thus, the scope of the invention is to be determined solely by the appended claims.

What is claimed is:

1. A method for displaying a message indicator in association with a predetermined interval of playback of an audiovisual production, the method comprising:
    playing back the audiovisual production in a first screen display size;
    displaying the message indicator during at least a portion of the predetermined interval of playback of the audiovisual production;
    determining that a user has selected the message indicator while the message indicator is displayed;
    automatically resizing the first screen display size to be a second screen display size that is smaller than the first screen display size, the second screen display size including the playback of the audiovisual production;
    providing a text window, wherein at least a portion of the text window is included in a portion of space previously occupied by the first screen display size;
    displaying at least a portion of a message in response to the user selection of the message indicator in the text window, wherein the message is included in a thread of a plurality of messages;
    providing an interface via which ratings for respective of a plurality of messages in a thread can be selected;
    providing an interface via which filtering and/or sorting of the plurality of messages can be selected based at least in part on associated ratings;
    in response to receiving a first user input, displaying one or more messages in a third screen display size and automatically pausing playback of the audiovisual production while displaying the one or more messages in the third screen display size, wherein the third screen display size is larger than the second screen display size and is larger than the text window; and
    in response to receiving a second user input after receiving the first user input, resuming playback of the audiovisual production.

2. The method of claim 1, wherein the at least a portion of the message is alphanumeric text displayed in the text window.

3. The method of claim 2, further comprising:
    accepting a signal from a user input device to resize an area used to display the audiovisual production; and
    accepting a signal from a user input device to allow resizing of the text window.

4. The method of claim 1, wherein the message indicator includes an icon.

5. The method of claim 1, wherein the message indicator includes a header of the message.

6. The method of claim 1, wherein the message is included in a thread of multiple messages, the method further comprising:
    displaying a plurality of messages in the thread in response to determining that the user has selected the message indicator.

7. The method of claim 1, wherein the audiovisual production is displayed in a first display area, the method further comprising:
    dynamically resizing the first display area to a second display area upon determining the user has selected the message indicator, the second display area being smaller than the first display area and displaying the audiovisual production.

8. The method of claim 7, wherein displaying the at least a portion of the message comprises displaying the at least a portion of the message in a portion of space vacated by the resizing of the first display area.

9. The method of claim 1, wherein the at least a portion of the message comprises a body of the message.

10. The method of claim 1, further comprising displaying a threaded view of additional message indicators for messages related to the message indicator.

11. The method of claim 10, further comprising:
    determining that the user has selected one of the additional message indicators; and
    expanding the one of the additional message indicators to include at least a portion of the message associated with the one of the additional message indicators.

12. The method of claim 1, wherein a plurality of message indicators are displayed, the method further comprising:
    removing a message indicator in the plurality of message indicators from the display after a period of time has passed.

13. The method of claim 1, wherein upon determining the user has selected the message indicator, the method further comprising:
    changing from a first display mode to a second display mode, the second display mode including an expanded messaging interface to display the at least a portion of the message.

14. The method of claim 1, wherein the message indicator is displayed in a first display area, wherein the at least a portion of the message is displayed in a second display area in a different area from the first display area.

15. The method of claim 1, wherein the first screen display size comprises a full screen view and the message indicator is superimposed on the audio-visual production.

16. The method of claim 1, wherein the third screen display size occupies a full screen.

17. An apparatus configured to display a message indicator in association with a predetermined interval of playback of an audiovisual production, the apparatus comprising:
    one or more processors; and
    a memory containing instructions that, when executed by the one or more processors, cause the one or more processors to perform operations comprising:
        playing back the audiovisual production in a first screen display size;
        displaying the message indicator during at least a portion of the predetermined interval of playback of the audiovisual production;
        determining that a user has selected the message indicator while the message indicator is displayed;
        automatically resizing the first screen display size to be a second screen display size that is smaller than the first screen display size, the second screen display size including the playback of the audiovisual production;

providing a text window, wherein at least a portion of the text window is included in a portion of space previously occupied by the first screen display size;

displaying at least a portion of a message in response to the user selection of the message indicator in the text window, wherein the message is included in a thread of a plurality of messages;

displaying at least a portion of one or more of the plurality of messages in the thread in response to determining that the user has selected the message indicator;

generating an interface via which ratings for respective of the plurality of messages in the thread can be selected;

generating an interface via which filtering and/or sorting of the plurality of messages can be selected based at least in part on associated ratings;

in response to receiving a first user input, displaying one or more messages in a third screen display size, the third screen display size larger than the second screen display size and larger than the text window;

automatically pausing playback of the audiovisual production while displaying the one or more messages using the third screen size; and in response to receiving a second user input after receiving the first user input, resuming playback of the audiovisual production.

18. The apparatus of claim 17, wherein the at least a portion of the message is alphanumeric text displayed in the text window.

19. The apparatus of claim 18 the method comprising:
accepting a signal from a user input device to resize an area used to display the audiovisual production; and
accepting a signal from a user input device to allow resizing of the text window.

20. The apparatus of claim 17, wherein the message indicator includes an icon.

21. The apparatus of claim 17, wherein the message indicator includes a header of the message.

22. The apparatus of claim 17, wherein the message indicator includes a subject line of the message.

23. The apparatus of claim 17, wherein the audiovisual production is displayed in a first display area, wherein the instructions cause the one or more processors to perform a further step comprising:
dynamically resizing the first display area to a second display area upon determining the user has selected the message indicator, the second display area being smaller than the first display area and displaying the audiovisual production.

24. The apparatus of claim 23, wherein the instructions cause the one or more processors to display the at least a portion of the message in a portion of space vacated by the resizing of the first display area.

25. The apparatus of claim 17, wherein the at least a portion of the message comprises a body of the message.

26. The apparatus of claim 17, the method further comprising:
displaying a threaded view of additional message indicators for messages related to the message indicator.

27. The apparatus of claim 26, the method further comprising:
determining that the user has selected one of the additional message indicators; and
expanding the one of the additional message indicators to include at least a portion of the message associated with the one of the additional message indicators.

28. The apparatus of claim 17, wherein a plurality of message indicators are displayed, the method further comprising:
removing a message indicator in the plurality of message indicators from the display after a period of time has passed.

29. The apparatus of claim 17, wherein upon determining the user has selected the message indicator, wherein the instructions cause the one or more processors to perform a further step comprising:
changing from a first display mode to a second display mode, the second display mode including an expanded messaging interface to display the at least a portion of the message.

30. The apparatus of claim 17, wherein the message indicator is displayed in a first display area, wherein the at least a portion of the message is displayed in a second display area in a different area from the first display area.

31. The apparatus of claim 17, wherein the first screen display size comprises a full screen view and the message indicator is superimposed on the audio-visual production.

32. The apparatus of claim 17, wherein the third screen display size occupies a full screen.

33. A tangible computer-readable medium having computer-executable instructions stored thereon that, if executed by a computing device, cause the computing device to perform operations comprising:
playing back an audiovisual production in a first screen display size;
displaying a message indicator in association with a predetermined interval of playback of the audiovisual production during at least a portion of the predetermined interval of playback of the audiovisual production;
determining that a user has selected the message indicator while the message indicator is displayed;
automatically resizing the first screen display size to be a second screen display size that is smaller than the first screen display size, the second screen display size including the playback of the audiovisual production;
providing a text window, wherein at least a portion of the text window is included in a portion of space previously occupied by the first screen display size;
displaying at least a portion of a message in response to the user selection of the message indicator in the text window, wherein the message is included in a thread of a plurality of messages;
displaying at least a portion of one or more of the plurality of messages in the thread in response to determining that the user has selected the message indicator;
generating an interface via which ratings for one or more of the plurality of messages in the thread can be submitted;
generating an interface via which filtering and/or sorting of the plurality of messages based at least in part on associated rating may be selected;
in response to receiving a first user input, displaying one or more messages in a third screen display size, the third screen display size larger than the second screen display size and larger than the text window;
automatically pausing playback of the audiovisual production while displaying the one or more messages using the third screen size; and
in response to receiving a second user input after receiving the first user input, resuming playback of the audiovisual production.

34. The computer-readable medium of claim 33, wherein the at least a portion of the message is alphanumeric text displayed in the text window.

35. The computer-readable medium of claim 34, further comprising:
one or more instructions for accepting a signal from a user input device to resize an area used to display the audiovisual production; and
one or more instructions for accepting a signal from a user input device to allow resizing of the text window.

36. The computer-readable medium of claim 33, wherein the message indicator includes an icon.

37. The computer-readable medium of claim 33, wherein the message indicator includes a header of the message.

38. The computer-readable medium of claim 33, wherein the message indicator includes a subject line of the message.

39. The computer-readable medium of claim 33, wherein the audiovisual production is displayed in a first display area, the computer-readable medium further step comprising:
one or more instructions for dynamically resizing the first display area to a second display area upon determining the user has selected the message indicator, the second display area being smaller than the first display area and displaying the audiovisual production.

40. The computer-readable medium of claim 39, further comprising one or more instructions for displaying the at least a portion of the message in a portion of space vacated by the resizing of the first display area.

41. The computer-readable medium of claim 33, wherein the at least a portion of the message comprises a body of the message.

42. The computer-readable medium of claim 33, further comprising:
one or more instructions for displaying a threaded view of additional message indicators for messages related to the message indicator.

43. The computer-readable medium of claim 42, further comprising:
one or more instructions for determining that the user has selected one of the additional message indicators; and
one or more instructions for expanding the one of the additional message indicators to include at least a portion of the message associated with the one of the additional message indicators.

44. The computer-readable medium of claim 33, wherein a plurality of message indicators are displayed, the computer-readable medium further comprising:
one or more instructions for removing a message indicator in the plurality of message indicators from the display after a period of time has passed.

45. The computer-readable medium of claim 33, wherein upon determining the user has selected the message indicator, the computer-readable medium further comprising:
one or more instructions for changing from a first display mode to a second display mode, the second display mode including an expanded messaging interface to display the at least a portion of the message.

46. The computer-readable medium of claim 33, wherein the message indicator is displayed in a first display area, wherein the at least a portion of the message is displayed in a second display area in a different area from the first display area.

47. The computer-readable medium of claim 33 wherein the first screen display size comprises a full screen view and the message indicator is superimposed on the audio-visual production.

48. The computer-readable medium of claim 33, wherein the third screen display size occupies a full screen.

* * * * *

UNITED STATES PATENT AND TRADEMARK OFFICE
CERTIFICATE OF CORRECTION

PATENT NO.        : 7,739,584 B2
APPLICATION NO.   : 10/622370
DATED             : June 15, 2010
INVENTOR(S)       : Zane Vella et al.

Page 1 of 1

It is certified that error appears in the above-identified patent and that said Letters Patent is hereby corrected as shown below:

Column 2, line 54, After "wish to see" delete "to see".

Column 19, line 31, In Claim 19, change "claim 18" to --claim 18,--.

Column 19, line 31, In Claim 19, change "method" to --operations--.

Column 22, line 27, In Claim 47, change "claim 33" to --claim 33,--.

Signed and Sealed this
Twenty-eighth Day of February, 2012

David J. Kappos
*Director of the United States Patent and Trademark Office*